(12) United States Patent
Okada et al.

(10) Patent No.: US 8,995,058 B2
(45) Date of Patent: Mar. 31, 2015

(54) DIFFRACTION GRATING LENS AND IMAGING DEVICE IN WHICH THE SAME IS USED

(75) Inventors: Yuka Okada, Hyogo (JP); Takamasa Ando, Osaka (JP); Tsuguhiro Korenaga, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 625 days.

(21) Appl. No.: 13/395,585

(22) PCT Filed: Aug. 12, 2011

(86) PCT No.: PCT/JP2011/004570
§ 371 (c)(1),
(2), (4) Date: Mar. 12, 2012

(87) PCT Pub. No.: WO2012/023274
PCT Pub. Date: Feb. 23, 2012

(65) Prior Publication Data
US 2012/0170121 A1 Jul. 5, 2012

(30) Foreign Application Priority Data

Aug. 19, 2010 (JP) .................................. 2010-184361

(51) Int. Cl.
*G02B 5/18* (2006.01)
*G02B 3/08* (2006.01)
(Continued)

(52) U.S. Cl.
CPC ............ *G02B 5/1814* (2013.01); *G02B 5/1871* (2013.01); *G02B 5/1895* (2013.01); *G02B 13/18* (2013.01); *G02B 27/4211* (2013.01); *G02B 27/4216* (2013.01); *G02B 27/4277* (2013.01)
USPC .......................................... 359/574; 359/742

(58) Field of Classification Search
CPC ................................ G02B 3/08; G02B 5/1876
USPC .......... 359/558, 566, 570, 571, 574, 575, 576, 359/742, 743
See application file for complete search history.

(56) References Cited

U.S. PATENT DOCUMENTS

| 4,995,715 A | 2/1991 | Cohen |
| 5,847,877 A | 12/1998 | Imamura et al. |

(Continued)

FOREIGN PATENT DOCUMENTS

| JP | 09-127321 A | 5/1997 |
| JP | 10-186118 A | 7/1998 |

(Continued)

OTHER PUBLICATIONS

International Search Report for corresponding International Application No. PCT/JP2011/004570 mailed Sep. 13, 2011.

*Primary Examiner* — Stephone B Allen
*Assistant Examiner* — Kimberly N Kakalec
(74) *Attorney, Agent, or Firm* — Renne, Otto, Boisselle & Sklar, LLP

(57) ABSTRACT

A diffraction grating lens according to the present invention is a diffraction grating lens 11 including: a lens body 12; and a plurality of diffraction steps relative to a base shape and a plurality of diffraction gratings 13 interposed between the diffraction steps, provided on a surface of the lens body 12. The lens body 12 is made of a first material having a refractive index $n_1(\lambda)$ at a used wavelength $\lambda$; the diffraction grating 13 is in contact with air; and the relationship of an inequality below is satisfied, where d is a design step length of the diffraction steps, and m is an order of diffraction. Each of the plurality of annular zones includes an intermediate portion and a pair of end portions sandwiching the intermediate portion along a radial direction, and in at least one of the plurality of annular zones, either one of a recess 18 and a protrusion 19 is provided in at least a portion of one of the pair of end portions, and the other one of the recess 18 and the protrusion 19 is provided in at least a portion of the other of the pair of end portions. Between two kinds of diffraction steps 17A and 17B of the diffraction grating 13, one is provided at a position where the phase difference from the base shape given the design wavelength $\lambda_0$ is not 2 nmπ.

$$0.9d \leq \frac{m \cdot \lambda}{n_1(\lambda) - 1} \leq 1.1d$$

15 Claims, 16 Drawing Sheets

(51) Int. Cl.
  *G02B 13/18* (2006.01)
  *G02B 27/42* (2006.01)

(56) References Cited

U.S. PATENT DOCUMENTS

| | | | |
|---|---|---|---|
| 6,008,942 A | 12/1999 | Ogusu et al. | |
| 2003/0039033 A1* | 2/2003 | Takeuchi et al. | 359/566 |
| 2003/0112515 A1 | 6/2003 | Nakabayashi | |
| 2008/0007831 A1* | 1/2008 | Nishiwaki et al. | 359/571 |
| 2009/0225215 A1 | 9/2009 | Korenaga et al. | |
| 2009/0225385 A1 | 9/2009 | Imai | |

FOREIGN PATENT DOCUMENTS

| | | |
|---|---|---|
| JP | 2002-048906 A | 2/2002 |
| JP | 2003-315526 A | 11/2003 |
| JP | 2004-077957 A | 3/2004 |
| JP | 2005-346004 A | 12/2005 |
| JP | 2006-072169 A | 3/2006 |
| JP | 2006-162822 A | 6/2006 |
| JP | 2006-317806 A | 11/2006 |
| JP | 2009-300507 A | 12/2009 |
| WO | 2007/132787 A1 | 11/2007 |

* cited by examiner (a) BASE ASPHERICAL SHAPE (b) PHASE FUNCTION (c) SHAPE OF DIFFRACTION GRATING PLANE
(BASE ASPHERICAL SHAPE + PHASE FUNCTION)

(d) SHAPE OF DIFFRACTION GRATING PLANE
(BASE ASPHERICAL SHAPE + PHASE FUNCTION + PROTRUSION/RECESS SHAPE)

(a) BASE ASPHERICAL SHAPE (b) PHASE FUNCTION (c) SHAPE OF DIFFRACTION GRATING PLANE
(BASE ASPHERICAL SHAPE + PHASE FUNCTION)

(a)

(b)

STRIPE FLARE

DIFFRACTION GRATING LENS AND IMAGING DEVICE IN WHICH THE SAME IS USED

TECHNICAL FIELD

The present invention relates to a diffraction grating lens (diffractive optical element) which effects convergence or divergence of light by utilizing a diffraction phenomenon, and an imaging device in which the same is used.

BACKGROUND ART

A diffraction grating lens which has a diffraction grating provided on the surface of a lens is good for correcting for lens aberrations such as curvature of field or chromatic aberration (a shift in an imaging point depending on wavelength). This is because a diffraction grating has the idiosyncratic properties of inverse dispersion and anomalous dispersion, and has a great ability of correcting for chromatic aberration. When a diffraction grating is used for imaging optics, the same performance can be attained with fewer lenses than is possible with an imaging optics that is composed only of aspherical lenses. This provides an advantage in that the production cost can be reduced and that the optical length can be shortened, thus realizing a low profile.

With reference to FIGS. 18(a) to (c), a conventional method for designing the shape of a diffraction grating lens will be described. A diffraction grating lens is mainly designed by a phase function method or a high-refractive-index method. Herein, a designing method based on the phase function method will be described. The end result will also be the same when the high-refractive-index method is used for designing.

The shape of a diffraction grating lens is formed by combining the base shape of a lens body on which the diffraction grating is provided, i.e., a shape defining a refractive lens, and the shape of the diffraction grating. FIG. 18(a) shows an example where the lens body has a base shape Sb which is an aspherical surface, whereas FIG. 18(b) shows an example shape Sp1 of the diffraction grating. The diffraction grating shape Sp1 shown in FIG. 18(b) is determined by a phase function. The phase function is expressed by eq. (1) below.

$$\phi(r) = \frac{2\pi}{\lambda_0}\psi(r) \quad (1)$$

$$\psi(r) = a_1 r + a_2 r^2 + a_3 r^3 + a_4 r^4 + a_5 r^5 + a_6 r^6 + \ldots + a_i r^i$$

$$(r^2 = x^2 + y^2)$$

Herein, $\phi(r)$ is a phase function which is represented by a shape Sp in FIG. 18(b); and $\Psi(r)$ is an optical path difference function ($z=\Psi(r)$). r is a distance from the optical axis along a radial direction; $\lambda_0$ is a design wavelength; and a1, a2, a3, a4, a5, a6, ..., ai are coefficients.

In the case of a diffraction grating which utilizes first-order diffracted light, an annular zone is provided at every point where the phase from a reference point (center) reaches $2\pi$ in the phase function $\phi(r)$, as shown in FIG. 18(b). The shape Sbp of the diffraction grating plane shown in FIG. 18(c) is determined by adding the diffraction grating shape Sp1, which is based on the curve of the phase function being split every $2\pi$, to the base shape Sb of FIG. 18(a).

In the case where the shape Sbp of the diffraction grating plane as shown in FIG. 18(c) is provided on an actual lens body, diffraction effects are obtained if the step height 141 of each annular zone satisfies eq. (2) below.

$$d = \frac{m \cdot \lambda}{n_1(\lambda) - 1} \quad (2)$$

Herein, m is a design order (m=1 in the case of first-order diffracted light); $\lambda$ is a wavelength used; d is a step height of the diffraction grating; and $n_1(\lambda)$ is the refractive index of a lens material which composes the lens body at the used wavelength $\lambda$. The refractive index of the lens material has wavelength dependence, and is a function of wavelength.

In any diffraction grating that satisfies eq. (2), there is a phase difference of $2\pi$ on the phase function between the foot and the edge of each annular zone, and, relative to light of the used wavelength $\lambda$, the optical path difference is an integer multiple of the wavelength. Therefore, the diffraction efficiency of first-order diffracted light relative to light of the used wavelength (hereinafter referred to as "first-order diffraction efficiency") can be made approximately 100%. When the used wavelength $\lambda$ changes, the value of d that makes the diffraction efficiency 100% will also change according to eq. (2). Conversely, if the d value is fixed, the diffraction efficiency will not be 100% at any wavelength other than the used wavelength $\lambda$ that satisfies eq. (2).

In the case where a diffraction grating lens is used for generic imaging applications, there is a need to diffract light in a broad wavelength band (e.g., a visible light region spanning wavelengths of about 400 nm to 700 nm). Consequently, as shown in FIG. 19, when a visible light beam enters a diffraction grating lens having a diffraction grating 152 provided on a lens body 151, not only first-order diffracted light 155 which is ascribable to light of the wavelength that is selected as the used wavelength $\lambda$, but also diffracted light 156 of orders that are unwanted (hereinafter also referred to as "diffracted light of unwanted orders") occurs. For example, if the wavelength which determines the step height d is a wavelength of green light (e.g., 540 nm), then the first-order diffraction efficiency at the green light wavelength will be 100%, so that no diffracted light 156 of unwanted orders will occur at the green light wavelength; however, the first-order diffraction efficiency will not be 100% at a red light wavelength (e.g., 640 nm) or a blue light wavelength (e.g., 440 nm), so that $0^{th}$ order diffracted light of red or second-order diffracted light of blue will occur. These $0^{th}$ order diffracted light of red and second-order diffracted light of blue are the diffracted light 156 of unwanted orders, which will spread across the image plane in the form of a flare or ghost, thus deteriorating the image or degrading the MTF (Modulation Transfer Function) characteristics. In FIG. 19, only second-order diffracted light is illustrated as the diffracted light 156 of unwanted orders.

As shown in FIG. 20, Patent Document 1 discloses providing an optical adjustment layer 161 which is composed of an optical material having a different refractive index and a different refractive index dispersion from those of the lens body 151, on the surface of a lens body 151 having a diffraction grating 152 formed thereon. Patent Document 1 discloses that, by prescribing specific conditions for the refractive index of the lens body 151 having the diffraction grating 152 formed thereon and the refractive index of the optical adjustment layer 161 formed so as to cover the diffraction grating 152, it is possible to reduce the wavelength dependence of diffraction efficiency, and suppress flare due to diffracted light of unwanted orders.

Patent Document 2 discloses, in order to prevent reflected light from the wall surfaces of the annular zones from being transmitted through the annular zone surfaces, providing light absorbing portions near the step feet of the annular zone surfaces. According to Patent Document 2, this structure can ensure that flare light reflected from the wall surface is not transmitted through the optical surface.

Patent Document 3 discloses a method of providing protrusions near the apices of annular zones of a diffraction grating so that the wavefront of spherical-wave light which is emitted from the annular zone surfaces is shaped into plane waves, thus improving the diffraction efficiency.

CITATION LIST

Patent Literature

[Patent Document 1] Japanese Laid-Open Patent Publication No. 09-127321
[Patent Document 2] Japanese Laid-Open Patent Publication No. 2006-162822
[Patent Document 3] Japanese Laid-Open Patent Publication No. 2003-315526

SUMMARY OF INVENTION

Technical Problem

The flare light which presents problems in the conventional techniques as disclosed in Patent Documents 1 to 3 is caused by diffracted light of unwanted orders associated with the wavelength dependence of first-order diffraction efficiency and reflected light from the wall surfaces of annular zones.

In answer thereto, the inventors have found that, if the pitch of annular zones of the diffraction grating of a diffraction grating lens is made smaller, or an image of a subject with a very large high intensity is taken, stripe flare light which is distinct from the aforementioned diffracted light of unwanted orders occurs. It is not known that such stripe flare light occurs in diffraction grating lenses. Moreover, it has been found by the inventors that, under certain conditions, stripe flare light may greatly deteriorate the quality of an image which has been taken.

The present invention has been made in order to solve at least one of such problems, and provides a diffraction grating lens which can suppress occurrence of stripe flare or suppress deteriorations in image quality due to occurrence of stripe flare, and an imaging device in which the same is used.

Solution to Problem

A diffraction grating lens according to the present invention is a diffraction grating lens comprising: a lens body; and a diffraction grating provided on a surface of the lens body, the diffraction grating having a plurality of diffraction steps relative to a base shape and a plurality of concentric annular zones each sandwiched by an adjoining pair among the plurality of diffraction steps, wherein, the lens body is made of a first material having a refractive index $n_1(\lambda)$ at a used wavelength $\lambda$; the diffraction grating is in contact with air; the relationship of $$0.9d \le \frac{m \cdot \lambda}{n_1(\lambda) - 1} \le 1.1d$$

is satisfied, where d is a design step length of the diffraction steps, and m is an order of diffraction; each of the plurality of annular zones includes an intermediate portion and a pair of end portions sandwiching the intermediate portions along a radial direction, and in at least one of the plurality of annular zones, either one of a recess and a protrusion is provided in at least a portion of one of the pair of end portions, and the other one of the recess and the protrusion is provided in at least a portion of the other of the pair of end portions; at positions excluding an outer peripheral edge of the diffraction grating, the plurality of diffraction steps include a plurality of first diffraction steps and at least one second diffraction step adjoining at least one of the plurality of first diffraction steps; edges of the plurality of first diffraction steps according to the design step length are located on a first face resulting from translating the base shape along an optical axis direction of the diffraction grating, and an edge of the at least one second diffraction step according to the design step length is located on a second face resulting from translating the base shape along the optical axis direction; and the first face and the second face are at respectively different positions along the optical axis.

Another diffraction grating lens according to the present invention is a diffraction grating lens comprising: a lens body; a diffraction grating provided on a surface of the lens body, the diffraction grating having a plurality of concentric diffraction steps relative to a base shape and a plurality of concentric annular zones each sandwiched by an adjoining pair among the plurality of diffraction steps; and an optical adjustment layer provided on the lens body, the optical adjustment layer covering the diffraction grating, wherein, the lens body is made of a first material having a refractive index $n_1(\lambda)$ at a used wavelength $\lambda$; the optical adjustment layer is made of a second material having a refractive index $n_2(\lambda)$ at the used wavelength $\lambda$; the relationship of $$0.9d \le \frac{m \cdot \lambda}{n_1(\lambda) - n_2(\lambda)} \le 1.1d$$

is satisfied, where d is a design step length of the diffraction steps, and m is an order of diffraction; each of the plurality of annular zones includes an intermediate portion and a pair of end portions sandwiching the intermediate portions along a radial direction, and in at least one of the plurality of annular zones, either one of a recess and a protrusion is provided in at least a portion of one of the pair of end portions, and the other one of the recess and the protrusion is provided in at least a portion of the other of the pair of end portions; at positions excluding an outer peripheral edge of the diffraction grating, the plurality of diffraction steps include a plurality of first diffraction steps and at least one second diffraction step adjoining at least one of the plurality of first diffraction steps; edges of the plurality of first diffraction steps according to the design step length are located on a first face resulting from translating the base shape along an optical axis direction of the diffraction grating, and an edge of the at least one second diffraction step according to the design step length is located on a second face resulting from translating the base shape along the optical axis direction; and the first face and the second face are at respectively different positions along the optical axis.

In a preferred embodiment, the plurality of diffraction steps include a plurality of second diffraction steps; and the first diffraction steps and the second diffraction steps alternate with each other.

In a preferred embodiment, an interval L between the first face and the second face along the optical axis satisfies the following inequality.

0.4d≤L≤0.9d

In a preferred embodiment, the interval L between the first face and the second face along the optical axis satisfies the following inequality.

0.4d≤L≤0.6d

In a preferred embodiment, the interval L between the first face and the second face along the optical axis satisfies L=0.5d.

In a preferred embodiment, the plurality of diffraction steps include a plurality of second diffraction steps; and the plurality of first diffraction steps and the plurality of second diffraction steps are disposed in successive units of i (where i is an integer of 2 or more) and successive units of j (where j is an integer of 2 or more), respectively, the i first diffraction steps alternating with the j second diffraction steps.

In a preferred embodiment, at least one of the protrusion and the recess is provided in a substantially entire circumference of the at least one annular zone.

In a preferred embodiment, a width of the protrusion and the recess along a direction which is on a plane containing the optical axis of the diffraction grating and which is perpendicular to the optical axis is in a range of no less than 5% and no more than 25% of a width of the at least one annular zone along a direction which is on a plane containing the optical axis of the diffraction grating and which is perpendicular to the optical axis.

In a preferred embodiment, a height of the protrusion and the recess along the optical axis direction of the diffraction grating is in a range of no less than 3% and no more than 20% of a design step length d of the diffraction step.

In a preferred embodiment, the protrusions and the recesses are provided in the plurality of annular zones.

In a preferred embodiment, the protrusions and the recesses are provided in at least two or more of the plurality of annular zones that are near an outer periphery of the diffraction grating.

A diffraction grating lens according to the present invention is a diffraction grating lens comprising: a lens body; and a diffraction grating provided on a surface of the lens body, the diffraction grating having a plurality of concentric diffraction steps relative to a base shape and a plurality of concentric annular zones each sandwiched by an adjoining pair among the plurality of diffraction steps, wherein, the lens body is made of a first material having a refractive index $n_1(\lambda)$ at a used wavelength λ; the diffraction grating is in contact with air; the relationship of $$0.9d \leq \frac{m \cdot \lambda}{n_1(\lambda) - 1} \leq 1.1d$$

is satisfied, where d is a design step length of the diffraction steps, and m is an order of diffraction; each of the plurality of annular zones includes an intermediate portion and a pair of end portions sandwiching the intermediate portions along a radial direction, and in at least one of the plurality of annular zones, either one of a recess and a protrusion is provided in at least a portion of one of the pair of end portions, and the other one of the recess and the protrusion is provided in at least a portion of the other of the pair of end portions; and the plurality of annular zones include first, second, and third annular zones adjoining one another, the second annular zone being interposed between the first and third annular zones, widths of the first annular zone and the third annular zone being substantially identical, and a width of the second annular zone being narrower than the width of the first annular zone.

In a preferred embodiment, the used wavelength λ is a wavelength in a visible light region, such that λ satisfies the inequality for any wavelength in the entire visible light region.

An imaging device according to the present invention comprises any of the above diffraction grating lenses and an imaging sensor.

Advantageous Effects of Invention

According to the present invention, edges of a plurality of first diffraction steps according to a design step length are located on a first face which results from translating a base shape along an optical axis direction of the diffraction grating, and an edge of at least one second diffraction step according to the design step length is located on a second face which results from translating the base shape along the optical axis direction, such that the first face and the second face are at respectively different positions along the optical axis. As a result, two kinds of annular zones with different annular zone widths will be included in the diffraction grating, so that stripes of flare caused by the two kinds of annular zones with different annular zone widths interfere with each other, whereby occurrence of stripe flare is suppressed.

Moreover, since either one of recesses or protrusions are provided at the inner brims of the annular zones, and the others are provided at the outer brims, the position at which stripe flare occurs can be shifted. As a result, a portion of the stripe flare can be allowed to overlap an image of a light source on the captured image, or the converged position of a portion of stripe flare can be shifted in the outer direction on the imaging plane. As a result, a cumulative light amount of stripe flare occurring in the neighborhood of the light source can be reduced, and the influences of stripe flare in the resultant captured image can be suppressed.

Thus, according to the present invention, with these two structures, occurrence of stripe flare can be suppressed, and the influences of stripe flare in the resultant captured image can be suppressed.

DESCRIPTION OF EMBODIMENTS

First, stripe flare light caused by a diffraction grating lens, as revealed by the inventors, will be described.

Figure 21:
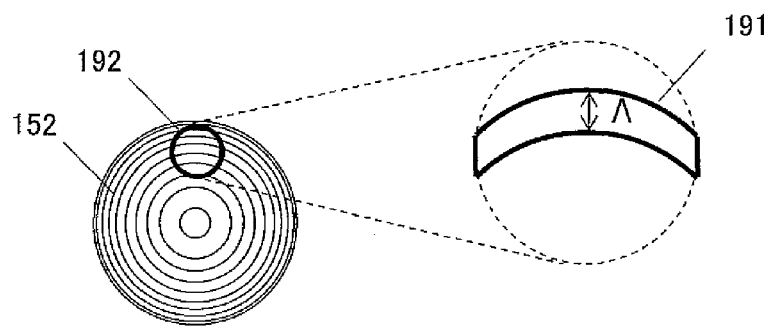
[FIG. 21] A diagram showing annular zones of a diffraction grating as viewed from an optical axis direction.
Figure 22:
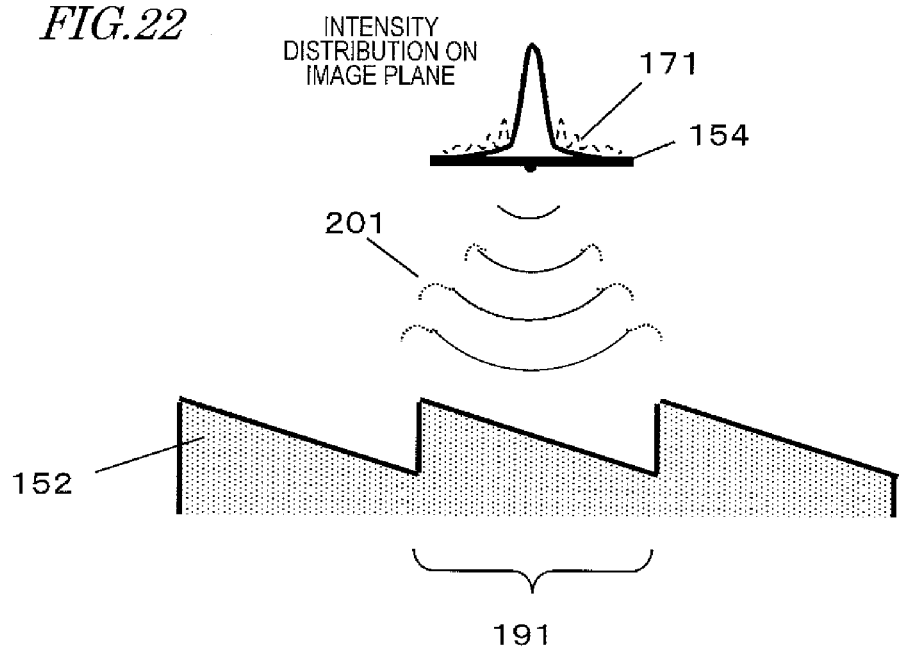
[FIG. 22] A diagram showing a state of a wavefront of light after being transmitted through an annular zone.

FIG. 21 is a plan view of a diffraction grating lens as viewed from an optical axis direction. FIG. 22 schematically shows a cross section of the diffraction grating, as well as the phase state of the wavefront of light which is transmitted through the diffraction grating. As shown in FIG. 21, the diffraction grating 152 includes a plurality of annular zones that are disposed in concentric circles. As shown in FIG. 21 and FIG. 22, among the plurality of annular zones, any one annular zone 191 is split from adjoining annular zones by diffraction steps which are provided between the annular zones; therefore, light which is transmitted through the annular zone 191 is split at the positions of the diffraction steps. As a result, the light transmitted through each annular zone of the diffraction grating can be regarded as light traveling through a slit having a pitch Λ of the annular zones.

When the pitch Λ of the annular zones decreases, light which is transmitted through the diffraction grating lens can be regarded as light traveling through very narrow slits which are disposed in concentric circles. As a result of this, as shown in FIG. 22, bending-around 201 of the light wavefront will be observed near the diffraction steps. The bending-around 201 of the wavefront is the factor causing stripe flare 171.

Figure 23:
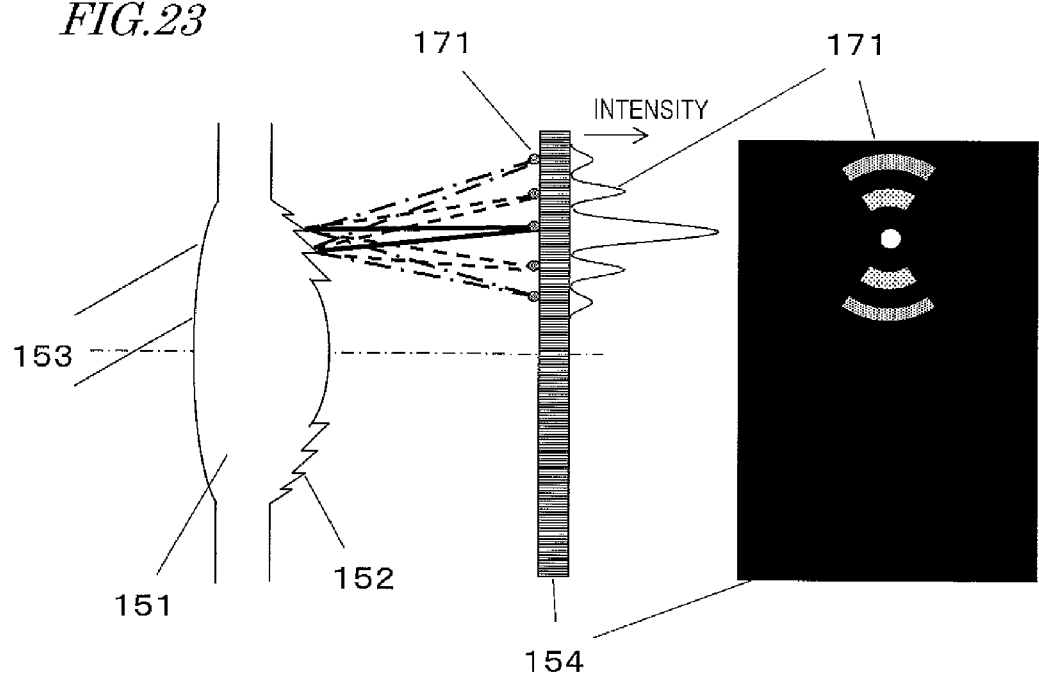
[FIG. 23] A schematic diagram showing how stripe flare occurs on an imaging sensor onto which a bundle of rays having passed through an annular zone is converged.

FIG. 23 schematically shows how light may enter a diffraction grating lens obliquely with respect to an optical axis 153, the diffraction grating lens having the diffraction grating 152 provided thereon, and the outgoing light may be diffracted by the diffraction grating 152. Generally speaking, the light which has bent around when traveling through a very narrow light-shielding slit forms a diffraction pattern around the central point of convergence at a point of observation at infinity. This is called Fraunhofer diffraction. This diffraction phenomenon also occurs at a finite distance (focal plane) in a lens system having a positive focal length. Since a diffraction grating usually includes a plurality of annular zones, each annular zone 191 forms a diffraction pattern due to Fraunhofer diffraction.

The inventors have confirmed through image evaluations with actual lenses that, when the pitch Λ of the annular zone 191 decreases, light transmitted through each annular zone 191 mutually interferes, thus resulting in stripe flare 171 of a fan shape as shown in FIG. 23. It has also been found that: such stripe flare 171 appears conspicuously when imaging optics are entered by an even greater amount of light than the incident light which is conventionally known to cause diffracted light of unwanted orders; and, while diffracted light of unwanted orders does not occur at certain wavelengths, stripe flare 171 occurs across the entire wavelength band used, including the design wavelength.

Figure 19:
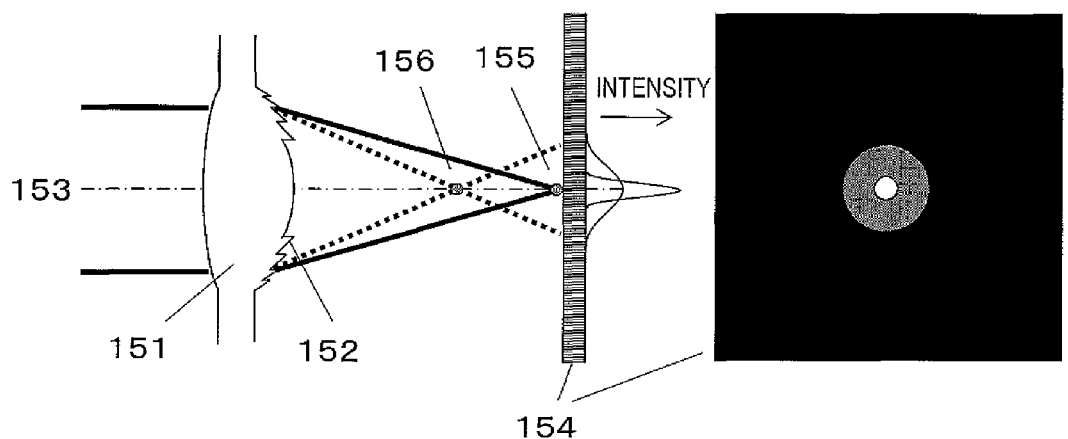
[FIG. 19] A diagram showing how unwanted diffracted light occurs in a conventional diffraction grating lens.
Figure 20:
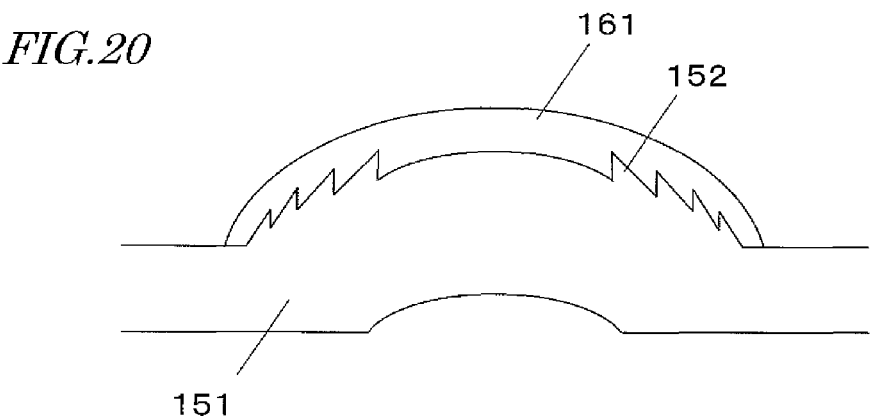
[FIG. 20] A cross-sectional view showing a conventional diffraction grating lens having an optical adjustment layer provided on a lens body.

Stripe flare will spread over an image even to a greater extent than diffracted light of unwanted orders, thus deteriorating the image quality. Especially, in an extreme environment with a large contrast ratio, such as when imaging a bright subject, e.g., a light in the night, the stripe flare 171 will be particularly conspicuous and therefore problematic. Moreover, stripe flare 171 will occur with pronounced stripes of bright and dark, and therefore be more conspicuous than diffracted light 156 of unwanted orders (FIG. 19), thus presenting a problem.

Figure 24:
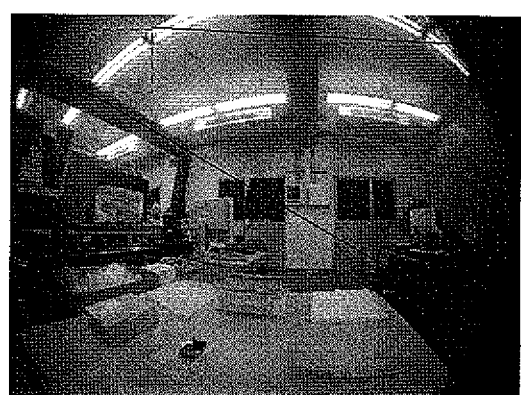
[FIGS. 24] (a) and (b) are diagrams showing an image which is taken by using an imaging device having a conventional diffraction grating lens.
Figure 24:
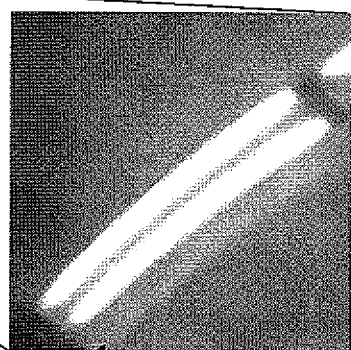

FIG. 24(a) shows an example of an image which is taken by using an imaging device having a conventional diffraction grating lens. The image shown in FIG. 24(a) is an image showing the inside of a room where fluorescent lamps are lit. FIG. 24(b) is an enlarged image of the neighborhood of a fluorescent lamp, within the image shown in FIG. 24(a). In FIG. 24(b), the bright light occurring near the lower portion of the fluorescent lamp is stripe flare.

In order to reduce the influences of stripe flare occurring in a captured image, the inventors have conceived of a diffractive optical element having a novel structure and an imaging device in which the same is used. Hereinafter, with reference to the drawings, embodiments of the diffraction grating lens according to the present invention will be described.

(First Embodiment)

Figure 1A:
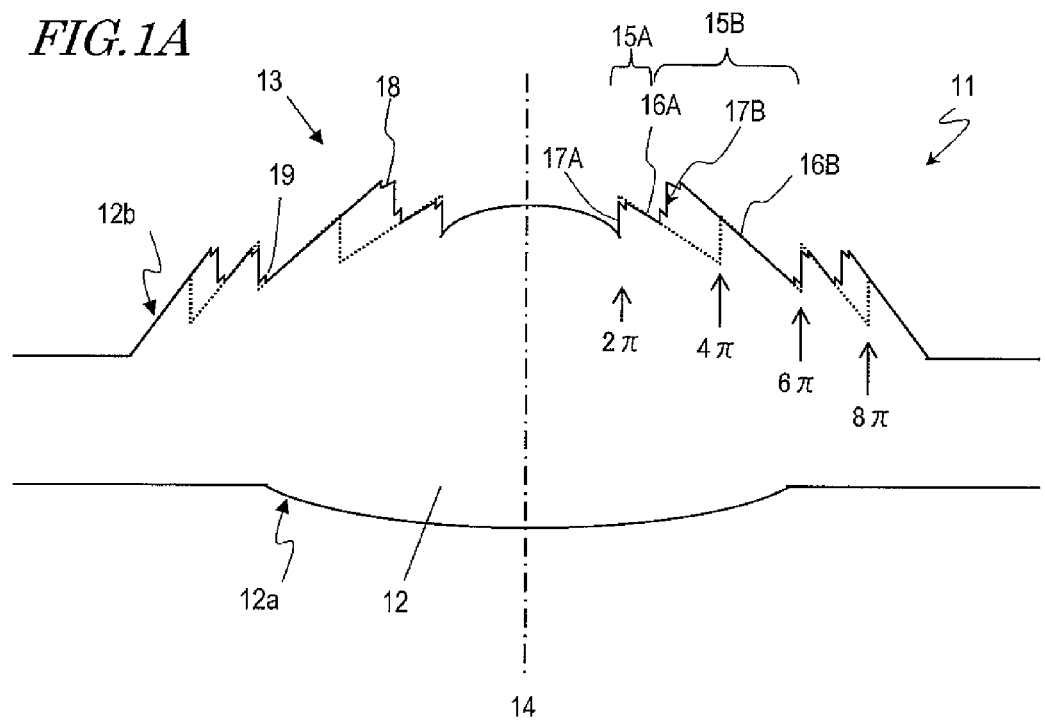
[FIG. 1A] A cross-sectional view showing a first embodiment of a diffraction grating lens according to the present invention.
Figure 1B:
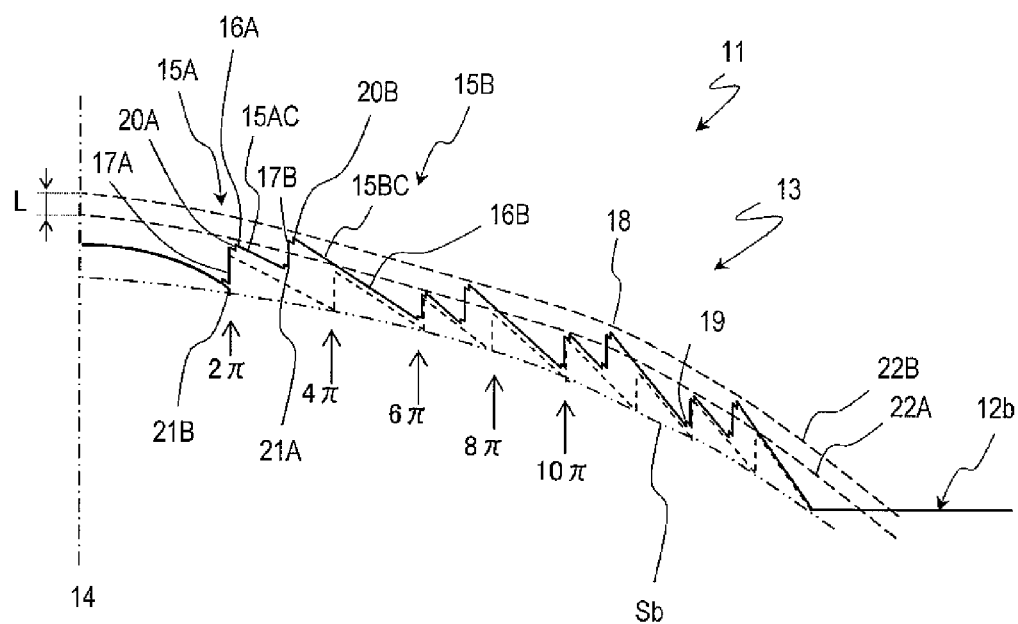
[FIG. 1B] An enlarged cross-sectional view showing the neighborhood of a diffraction grating of the diffraction grating lens shown in FIG. 1A.
Figure 1C:
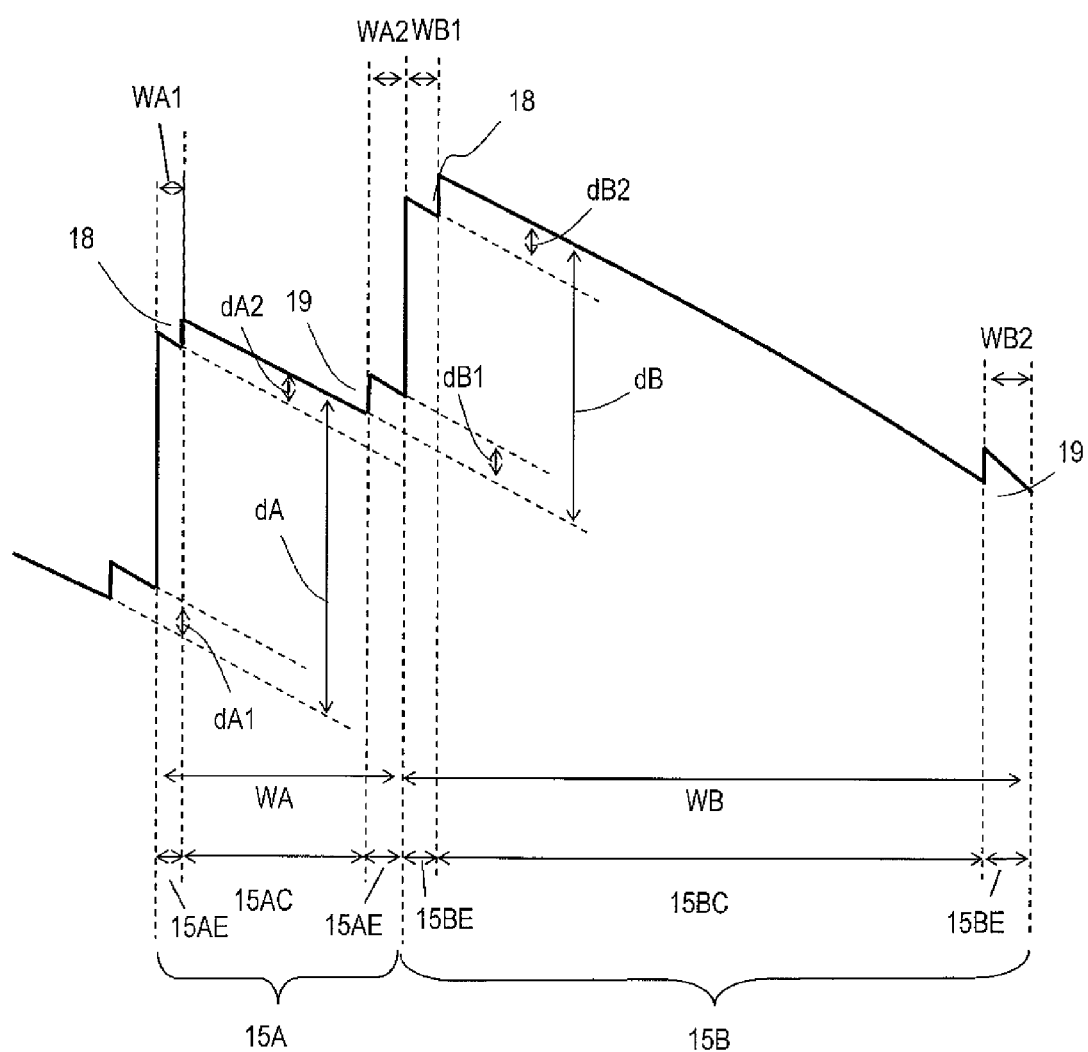
[FIG. 1C] A further enlarged cross-sectional view showing the neighborhood of a diffraction grating of the diffraction grating lens shown in FIG. 1A.

Hereinafter, a first embodiment of the diffraction grating lens according to the present invention will be described. FIG. 1A is a cross-sectional view showing a diffraction grating lens 11 of the first embodiment, and FIG. 1B is an enlarged cross-sectional view showing the neighborhood of a diffraction grating 13 of the diffraction grating lens 11. FIG. 1C is an enlarged cross-sectional view showing annular zones 15A and 15B of the diffraction grating 13.

The diffraction grating lens 11 includes a lens body 12. The lens body 12 has a first surface 12a and a second surface 12b, with the diffraction grating 13 being provided on the second surface 12b. Although the diffraction grating 13 is provided on the second surface 12b in the present embodiment, it may be provided on the first surface 12a, or each of the first surface 12a and the second surface 12b may have one provided thereon.

The present embodiment illustrates the base shapes of the first surface 12a and the second surface 12b to be aspherical shapes. However, the base shape may be spherical or planar. The first surface 12a and the second surface 12b may have an identical base shape, or different base shapes. Although the base shapes of the first surface 12a and the second surface 12b are convex aspherical shapes, they may be concave aspherical shapes. Furthermore, one of the base shapes of the first surface 12a and the second surface 12b may be convex, and the other may be concave.

In the present specification, a "base shape" means a shape of a surface of the lens body 12 as designed, before the shape of the diffraction grating 13 is conferred thereto. Unless structures such as the diffraction grating 13 are conferred to its surface, the surface of the lens body 12 has a base shape. In the present embodiment, since no diffraction grating is provided on the first surface 12a, the base shape of the first surface 12a is the surface shape that the first surface 12a possesses, which is an aspherical shape.

On the other hand, the second surface 12b is constructed by providing the diffraction grating 13 on a base shape. Because the diffraction grating 13 is provided on the second surface 12b, the second surface 12b of the lens body 12, with the diffraction grating 13 provided thereon, is not an aspherical shape. However, since the diffraction grating 13 has a shape that is based on predetermined conditions as will be described below, the base shape of the second surface 12b is inferable from the macroscopic shape of the second surface 12b on which the shape of the diffraction grating 13 is provided. Since the base shape is a design shape, the lens body 12 before the diffraction grating 13 is conferred thereto does not need to possess a surface of the base shape.

Relative to a base shape, the diffraction grating 13 has a shape for causing light which is transmitted through the diffraction grating 13 to be diffracted in a designed order of diffraction. Specifically, the diffraction grating 13 has a plurality of diffraction steps relative to a base shape, and a plurality of concentric annular zones each sandwiched by an adjoining pair among the plurality of diffraction steps. The plurality of annular zones include a plurality of annular zones 15A and 15B, and the plurality of diffraction steps include a plurality of diffraction steps 17A and 17B. Between an annular zone 15A and an annular zone 15B, one diffraction step 17A or diffraction step 17B is provided. The annular zones 15A and 15B are annular protrusions sandwiched between diffraction steps 17A and 17B. In the present embodiment, the annular zones 15A and 15B are disposed in concentric circles around an optical axis 14 of the aspherical surface which is the base shape of the first surface 12a and the aspherical surface which is the base shape of the second surface 12b. In other words, the optical axis of the diffraction grating 13 coincides with the optical axis 14 of the aspherical surfaces. It is not necessary for the annular zones 15A and 15B to be disposed in concentric circles. However, in order to ensure good aberration characteristics in the imaging optics, it is desirable that the annular zone shapes of the annular zones 15A and 15B are rotation symmetrical with respect to the optical axis 14.

As shown in FIG. 1A, among the diffraction steps 17A and 17B of the diffraction grating 13, each diffraction step 17B is disposed at a position where the phase difference from the base shape of the second surface 12b given a design wavelength $\lambda_0$ is not $2 \text{ nm}\pi$. Each diffraction step 17A is provided, as has conventionally been the case, at a position where the phase difference from the base shape of the second surface 12b given the design wavelength $\lambda_0$ is $2 \text{ nm}\pi$. Herein, n is a positive integer, and m is an order of diffraction. The order of diffraction is defined by 0 or a positive or negative integer; however, no diffraction occurs when the order of diffraction is 0. Therefore, in the present invention, m is a positive or negative integer. Because of this characteristic feature, as will be described in detail below, the adjoining annular zones 15A and annular zones 15B have different widths from each other. As used herein, the width of an annular zone 15A or 15B refers to the distance between diffraction steps 17A and 17B along a radial direction, or more specifically, a direction which is on a plane containing the optical axis 14 and which is perpendicular to the optical axis.

Moreover, as shown in FIG. 1C, each annular zone 15A includes an intermediate portion 15A and a pair of end portions 15AE sandwiching the intermediate portion 15A along a radial direction. Similarly, each annular zone 15B includes an intermediate portion 15B and a pair of end portions 15BE sandwiching the intermediate portion 15B along a radial direction. In each annular zone 15A or 15B, a recess 18 is provided at the inner end portion 15AE or 15BE (i.e., near the inner brim), and a protrusion 19 is provided at the outer end portion 15AE or 15BE (i.e., near the outer brim). The recess 18 and the protrusion 19 are provided in portions respectively of the inner end portion 15AE or 15BE and the outer end portion 15AE or 15BE, and preferably across the entire inner end portion 15AE or 15BE and the entire outer end portion 15AE or 15BE. In a plane containing the optical axis 14 of the diffraction grating lens 11, each annular zone 15A or 15B has a sawtooth cross-sectional shape, such that an edge of the sawtooth is located toward the center of the diffraction grating lens 11 and a foot of the sawtooth is located on the outer side. When a refractive index $n_1(\lambda)$ of the lens body 12 is greater than a refractive index $n_2$ of any medium that is in contact with the diffraction grating 13, the diffraction grating 13 converges light by utilizing first-order diffracted light, based on this shape.

In each annular zone 15A or 15B, the intermediate portion of the annular zone where the recess 18 and the protrusion 19 are not provided is constructed so as to, by utilizing diffracted light of the designed order, convert light entering the diffraction grating lens 11 into light of a designed convergence state, as has conventionally been the case. Specifically, the intermediate portion of each annular zone has a shape which is determined by the phase function expressed by eq. (1).

As shown in FIG. 1C, since the recess 18 and the protrusion 19 are provided, the step length (difference in position between adjoining annular zones 15A and 15B along the optical axis 14 direction) of each diffraction step 17A or 17B is shorter than the step length of the diffraction steps of the case where neither the recess 18 nor the protrusion 19 is provided, by the heights of the recess 18 and the protrusion 19 along the optical axis 14 direction. However, the fact is that the step length of each diffraction steps 17A or 17B only appears to be shorter because of the protrusion 19 and recess 18 being formed at the foot and edge of each diffraction step 17A or 17B. As shown in FIG. 1C, in the diffraction grating lens 11, the distance dA or dB between the intermediate portions of any adjoining annular zones 15A and 15B along the optical axis 14 direction is equal to a design step length d.

When the design step length d satisfies the above eq. (2) across the entire used wavelengths of the diffraction grating lens 11, the diffraction grating lens 11 can attain a 100% diffraction efficiency without depending on the wavelength. Herein, m is a design order (m=1 in the case of first-order diffracted light), and $n_1(\lambda)$ is a refractive index of the lens material composing the lens body 12 at the used wavelength $\lambda$. However, in an actual diffraction grating lens 11, even if the diffraction efficiency is not 100%, an adequate optical performance can be obtained so long as the diffraction efficiency is equal to or greater than about 90%. According to a detailed study, this condition is expressed by eq. (3).

$$0.9d \le \frac{m \cdot \lambda}{n_1(\lambda) - 1} \le 1.1d \quad (3)$$

Thus, the diffraction grating lens 11 of the present embodiment is characterized in that: (i) among the diffraction steps 17A and 17B of the diffraction grating 13, any diffraction step 17B is provided at a position where the phase difference from the base shape of the second surface 12b at the design wavelength $\lambda_0$ is not 2 nm$\pi$ (hereinafter referred to as structure (i)). It is also characterized in that: (ii) in each annular zone 15A or 15B of the diffraction grating 13, a recess 18 is provided at the inner end portion 15AE or 15BE, and a protrusion 19 is provided at the outer end portion 15AE or 15BE (hereinafter referred to as structure (ii)). These two structures (i) and (ii) each independently suppress occurrence of stripe flare, and suppress deteriorations in the quality of the captured image due to stripe flare. Hereinafter, with reference to FIGS. 2(a) to (d), a method of designing the shape of the second surface 12b having the diffraction grating 13, as well as these two structures (i) and (ii), will be described.

The shape of the second surface 12b having the diffraction grating 13 is designed by first designing structure (i), and then conferring structure (ii) to structure (i). Firstly, structure (i) will be described. As mentioned above, the shape of the second surface 12b of the diffraction grating lens 11 is composed of the base shape of the lens body 12 on which a diffraction grating is to be provided, and the shape of the diffraction grating 13 itself, which is provided relative to the base shape. FIG. 2(a) shows an example where the base shape Sb of the second surface 12b is an aspherical surface, and FIG. 2(b) shows an example of the shape Sp2 of the diffraction grating 13. The diffraction grating shape Sp2 shown in FIG. 2(b) is determined from a phase function, which is expressed by eq. (1) above.

In the case of utilizing first-order diffracted light, i.e., m=1, as shown in FIG. 2(b), at positions where the phase difference from a reference point (center) is 2n$\pi$ according to the phase function $\phi(r)$, and at positions where it is not 2n$\pi$, the shape Sp of the curve of the phase function is split, and the split curves are shifted by 2n$\pi$ in the minus direction. That is, diffraction steps are provided at these positions. As a result, as shown in FIG. 2(b), the shape Sp2 of the diffraction grating 13 is composed of split curve fragments s1, s2, s3, s4, s5, . . . . In a conventional diffraction grating, a curve fragment sa which is indicated by a broken line in FIG. 2(b) would be connected to the curve fragment s1 since its phase difference from the reference point is between 2$\pi$ and 4$\pi$. However, in the present embodiment, since splitting occurs at a position other than 2n$\pi$, it is connected to the curve fragment s2 as a curve fragment sa'. By adding the diffraction grating shape Sp2 based on these split curves of the phase difference function to the base shape Sb of FIG. 2(a), the shape Sbp2 of the diffraction grating plane as shown in FIG. 2(c) is determined. Conversion from the phase function into an optical path difference function employs the relationship of eq. (1).

When the shape Sbp2 of the diffraction grating plane shown in FIG. 2(c) is provided on an actual lens body, diffraction effects will be obtained if the height d of the diffraction step satisfies eq. (2).

Although the used wavelength $\lambda$ is equal to the design wavelength $\lambda_0$ in general cases, it may be different therefrom. A design wavelength used in a phase function is determined at the center of the visible light region (e.g., 540 nm) in order to reduce aberration, for example. On the other hand, the used wavelength $\lambda$ which is employed for the height d of the diffraction steps is determined by giving priority to diffraction efficiency, for example. Therefore, in the case where the diffraction efficiency has an asymmetric distribution with respect to the central wavelength across the entire visible light region, the used wavelength $\lambda$ is slightly displaced from the center of the visible light region in some cases. In such cases, the used wavelength $\lambda$ is different from the design wavelength $\lambda_0$.

The shape Sbp2 of the diffraction grating plane shown in FIG. 2(c) is an actual shape of the second surface 12b of the lens body 12. However, the z direction, i.e., the optical path difference, depends on the difference in refractive index between the lens body 12 and any medium that is in contact with and on the wavelength of the light used. Since the diffraction grating shape Sp2 which is based on the curve of the phase function shown in FIG. 2(b) is split at positions where the phase difference from the reference point is 2n$\pi$ and at positions where it is not 2n$\pi$, the values of the phase function of FIG. 2(b) are converted into optical path lengths, and are added to the base shape Sb of the lens body shown in FIG. 2(a). In this manner, the split positions, i.e., the diffraction steps, are provided at positions where the optical path difference from the base shape given the design wavelength $\lambda_0$ is an integer multiple of the wavelength (2n$\pi$ on the phase function) and at positions where it is not an integer multiple thereof (2n$\pi$ on the phase function). Specifically, there are the diffraction steps 17A, which are provided at positions corresponding to integer multiples of the wavelength (2n$\pi$ on the phase function), and the diffraction steps 17B, which are provided at positions not corresponding to integer multiples thereof (2n$\pi$ on the phase function). Therefore, the annular zones 15A having a relatively small annular zone width and the annular zones 15B having a relatively large annular zone width are contained in the shape Sbp2 of the diffraction grating plane. However, the heights of the diffraction steps 17A and the diffraction steps 17B are all d. This is because, as has been described with reference to FIG. 2(b), the curve fragments s1, s2, s3, s4, s5, . . . are split by being shifted by 2n$\pi$ in the minus direction on the phase function. Moreover, the phase function may include constant terms in addition to eq. (1). In this case, the reference point will no be longer 0, and the positions of the diffraction steps will be universally shifted by a constant amount along the r direction in FIG. 2(b).

Thus, in the actual lens body 12, the diffraction steps 17A and 17B are to be provided in accordance with the optical path difference from the base shape at the design wavelength $\lambda_0$. However, as described above, the optical path difference depends on the difference in refractive index between the lens body 12 and any medium that is in contact with and on the wavelength of the light used. Therefore, in the following description, the positions of the diffraction steps 17A and 17B will be discussed in terms of phase differences on the phase function.

As shown in FIG. 2(c), since the diffraction steps 17A and 17B are provided at positions where the phase difference from the base shape given the design wavelength $\lambda_0$ is $2n\pi$ and at positions where it is not $2n\pi$, the diffraction grating 13 includes two kinds of annular zones 15A and annular zones 15B. As a result, between any adjoining annular zone 15A and annular zone 15B, the annular zone 15A has an annular zone surface 16A with a relatively short width and has a relatively short annular zone width, and the annular zone 15B has an annular zone surface 16B with a relatively long width and has a relatively long width along the direction which is perpendicular to the optical axis of the annular zone. Thus, stripe flare 171 is suppressed by the inclusion of the two kinds of annular zones 15A and annular zones 15B in the diffraction grating 13, such that the two kinds of annular zones 15A and annular zones 15B differ in annular zone width or annular zone surface width. As shown in FIG. 1B, in the second surface 12b, an edge 20A of each annular zone 15A is located on a first face 22A which results from translating the base shape Sb in the optical axis direction of the diffraction grating 13. Similarly, the edge 20B of each annular zone 15B is located on a second face, different from the first face which results from translating the base shape Sb in the optical axis direction of the diffraction grating 13. Herein, edges 20A and 20B refer to the edges of the diffraction steps 17A and 17B before even providing structure (ii), i.e., the recesses 18 and the protrusions 19, having the design step length d. When the diffraction steps 17B are at positions other than $2n\pi$, and the phase difference between adjoining diffraction steps 17B is $2n\pi$, the edge 20B of each annular zone 15B is located on the same second face 22B, different from the first face 22A which results from translating the base shape Sb in the optical axis direction of the diffraction grating 13. The interval L between the first faces 22A and the second faces 22B along the optical axis of the diffraction grating 13 has a value which is equal to or less than the height d of the diffraction steps 17A and the diffraction steps 17B.

That is, when the edges of all annular zones are not on a single plane which results from translating the base shape Sb in the optical axis direction of the diffraction grating 13, at least one diffraction step is provided at a position where the phase difference from the base shape given the design wavelength $\lambda_0$ is not $2n\pi$, so that the two adjoining annular zones sandwiching that diffraction step differ in width.

The same also applies to the feet 21A of the annular zones 15A and the feet 21B of the annular zones 15B. As used herein, the feet 21A and 21B refer to the feet of the diffraction steps 17A and 17B before even providing structure (ii), i.e., the recesses 18 and the protrusions 19, having the design step length d. The foot 21A of each annular zone 15A is located on a curved surface which results from translating the base shape Sb in the optical axis direction, and the foot 21B of each annular zone 15B is located on a curved surface which results from translating the base shape Sb in the optical axis direction. However, the curved surface on which the feet 21A are located is distinct from the curved surface on which the feet 21B are located.

In a conventional diffraction grating lens, diffraction steps are provided only at positions corresponding to $2n\pi$, and thus the edges of the annular zones are all located on one curved surface which results from translating the base shape in the optical axis direction. Similarly, the foots of the annular zones are all located on one curved surface which results from translating the base shape in the optical axis direction. Thus, it can be said that the aforementioned diffraction grating structure is unique to the present invention.

In actuality, because of the recesses 18 and the protrusions 19 being provided, the edges 20A and 20B and the feet 21A and 21B are not the edges and feet of actual annular zones or diffraction steps. However, since the design shape Sbp2 of the diffraction grating plane before providing the recesses 18 and the protrusions 19 can be identified from the shapes of the intermediate portions of the annular zones 15A and 15B, on which the recesses 18 and the protrusions 19 are not provided, it is also possible to identify the positions of the edges 20A and 20B and the feet 21A and 21B.

Figure 18:
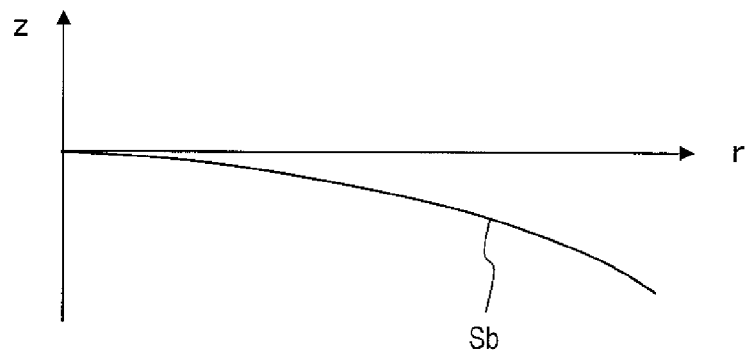
[FIG. 18] (a) to (c) are diagrams showing a method of deriving the shape of a diffraction grating plane of a conventional diffraction grating lens.
Figure 18:
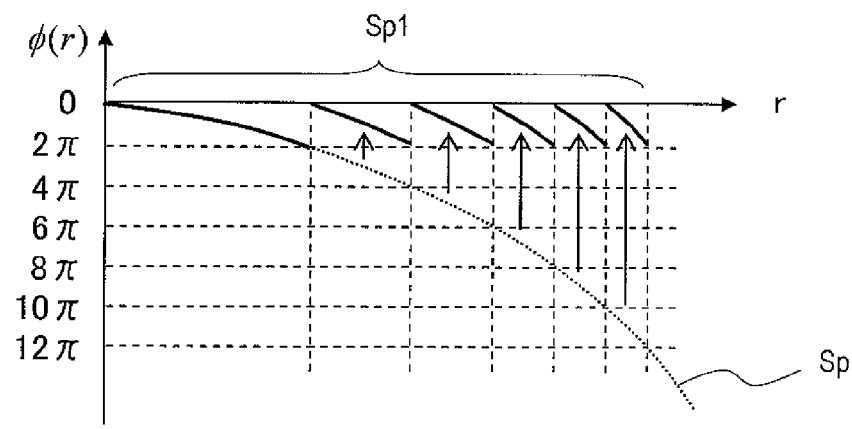
Figure 18:
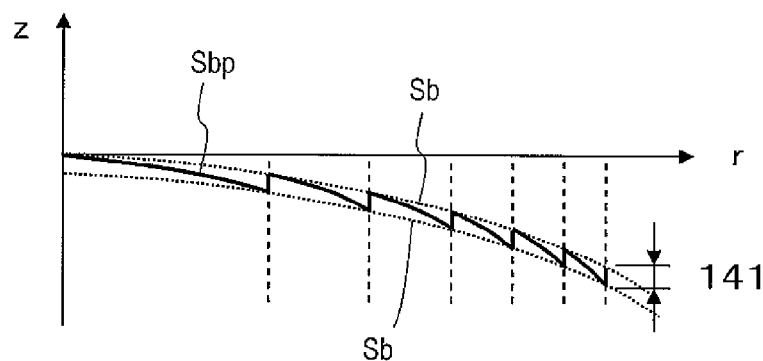

Moreover, as shown in FIGS. 18(b) and (c), in conventional diffraction grating lenses, the annular zone width becomes narrower toward the outer periphery of the diffraction grating, but the annular zone width is approximately identical within a series of about three adjoining annular zones. On the other hand, in the diffraction grating lens 11 of the present embodiment, given an annular zone 15A and two annular zones 15B sandwiching the annular zone 15A, the adjoining two annular zones 15B sandwiching the annular zone 15A have an identical width, and the annular zone 15A sandwiched between the two annular zones 15B has a narrower width than the width of the annular zones 15B. As used herein, two annular zones 15B having an identical width encompasses not only the case where the two annular zones having an equal width, but also the case where, even if the two widths are not equal, the width of the longer annular zone being within 1.05 times the width of the shorter annular zone.

Figure 3:
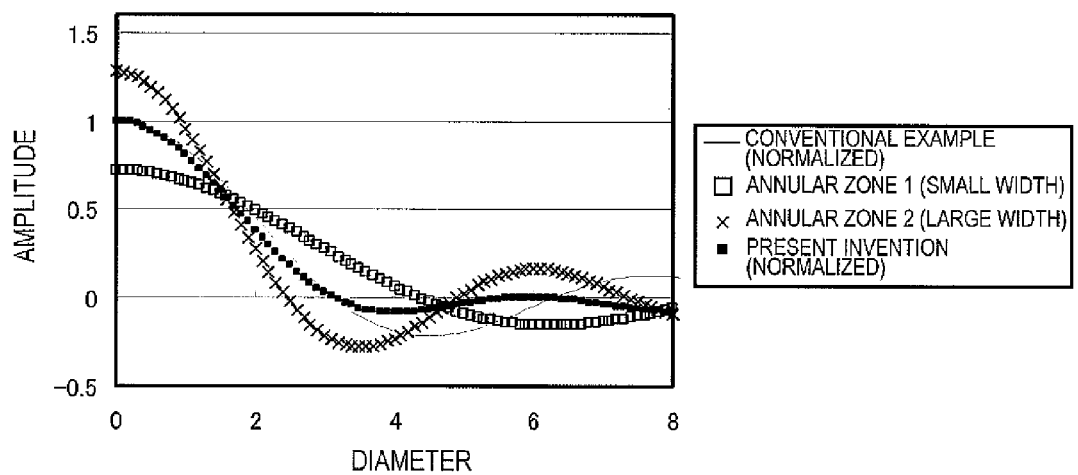
[FIG. 3] A diagram showing reasons why stripe flare is suppressed in the diffraction grating lens shown in FIG. 1.

FIG. 3 is a graph describing the reason why stripe flare 171 is reduced by structure (i) in the diffraction grating lens 11 having the diffraction grating 13 provided thereon. As shown in FIG. 3, in Fraunhofer diffraction light (diffraction pattern) ascribable to the annular zones 1 having a narrow annular zone width, there is a relatively wide wave interval along the radial direction, and in Fraunhofer diffraction light ascribable to the annular zones 2 having a broad annular zone width, there is a relatively narrow wave interval along the radial direction. In the amplitude intensity near the center, which reflects the annular zone width, the intensity of Fraunhofer diffraction light ascribable to the annular zones 1 is weaker, and the intensity of the Fraunhofer diffraction light ascribable to the annular zones 2 is stronger. The Fraunhofer diffraction light by the diffraction grating of the present embodiment is a sum of the Fraunhofer diffraction light ascribable to the annular zones 1 and the Fraunhofer diffraction light ascribable to the annular zones 2. As can be seen from FIG. 3, since the wave interval along the radial direction differs between the Fraunhofer diffraction light ascribable to the annular zones 1 and the Fraunhofer diffraction light ascribable to the annular zones 2, waves cancel out each other at positions other than near the center, so that the light amplitude is decreased relative to that of the Fraunhofer diffraction light by a conventional diffraction grating. In other words, stripe flare 171 is reduced.

As can be understood from the above description, this effect occurs due to the diffraction steps being provided at positions corresponding to $2n\pi$ and positions other than $2n\pi$, such that any adjoining annular zone 15A and annular zone 15B have differing widths. Therefore, so long as the phase difference from the base shape is not $2n\pi$, each diffraction step 17B can be provided at any arbitrary position.

Preferably, the position of any diffraction step 17B that is provided at a place where the phase difference from the base shape is not $2n\pi$ has a deviation of $\pi/5$ or more, i.e., is shifted by ±10% or more from a position corresponding to $2n\pi$. The reason is that, when the amount of shift is within ±10%, the interference effect of light undergoing two kinds of Fraunhofer diffraction is not sufficient. More preferably, the amount of shift is in a range from −40% to −90%, and more preferably in a range from −40% to −60%.

As shown in FIG. 2(b), on the phase function, an amount of shift δ of any diffraction step provided at a position other than $2n\pi$, from a position corresponding to $2n\pi$, is equal to an amount of shift δ' in edge between the diffraction step provided at the position corresponding to $2n\pi$ and a diffraction step provided at the position other than $2n\pi$. Therefore, the aforementioned preferable amount of shift of each diffraction step 17B from the position corresponding to $2n\pi$ can be expressed as an amount of shift of the interval L, along the optical axis of the diffraction grating 13, between the first face 22A on which the edges 20A of the annular zones 15A are located and the second face 22B on which the edges 20B of the annular zones 15B are located (having been described with reference to FIG. 1B) from the diffraction step d. When employing the interval L along the optical axis of the diffraction grating 13 between the first face 22A on which the edges 20A of the annular zones 15A are located and the second face 22B on which the edges 20B of the annular zones 15B are located, the interval L preferably satisfies $0.4d \le L \le 0.9d$ and more preferably satisfies $0.4d \le L \le 0.6d$.

Moreover, it is preferable that the position of any diffraction step 17A provided at a position where the phase difference from the base shape is $2n\pi$ has an amount of shift which is smaller than ±10% from the position corresponding to $2n\pi$. The reason is that, when the amount of shift is ±10% or more, the characteristics of the diffraction grating are significantly changed. In order to allow the characteristics of the diffraction grating 13 to be exhibited as designed, it is preferable that the amount of shift is as small as processing allows.

Although the diffraction grating lens 11 utilizes first-order diffracted light of the diffraction grating 13 in the present embodiment, the second or higher order of diffraction may be utilized. In this case, the diffraction steps 17A and 17B are provided at positions where the phase difference from the base shape given the design wavelength $\lambda_0$ is 2 nmπ and at positions where it is not 2 nmπ, m being the order of diffracted light that is used.

So long as one or more diffraction steps 17B are provided in the diffraction grating 13, annular zones 15A and 15B having different annular zone widths will be formed, and the aforementioned effects of the present invention will be obtained. However, it is preferable that the diffraction steps 17B are provided within an effective diameter of the diffraction grating lens 11. Steps that are provided outside the effective diameter do not function as diffraction steps 17B. For example, in some cases, a lens flange for holding a diffraction grating lens may be provided in the lens body at the outer periphery of the diffraction grating. Even if the step associated with this flange is at a position where the phase difference from the base shape is not 2 nmπ, it will not function as a diffraction step 17B. In other words, it is preferable that the diffraction steps 17B are provided in regions other than the outer peripheral edge of the diffraction grating 13. If the step associated with the lens flange happens to be at a position where the phase difference from the base shape is not 2 nmπ, it is preferable that at least another diffraction step 17B is provided within the effective diameter of the diffraction grating lens 11.

Figure 4:
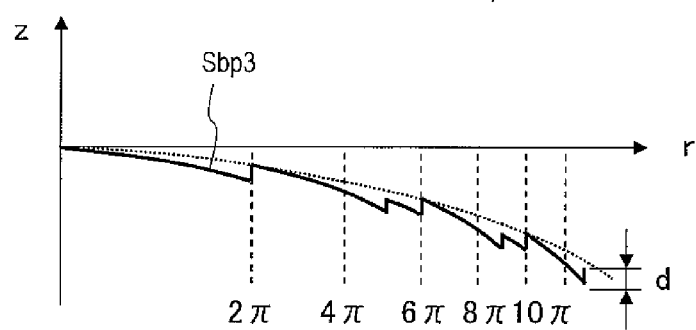
[FIG. 4] A diagram showing the surface shape of a diffraction grating in which diffraction steps are provided at different positions from those of the diffraction grating shown in FIG. 2(c).

So long as the phase difference from the base shape is not $2n\pi$, the diffraction steps 17B may be provided in any arbitrary positions. In FIG. 2(c), the diffraction steps 17B are provided at positions corresponding to $3\pi$, $7\pi$, $11\pi$, . . . . However, as shown in FIG. 4, for example, an diffraction grating plane shape Sbp2 in which diffraction steps 17B are provided at positions corresponding to $5\pi$, $9\pi$, $13\pi$, . . . may be provided on the second surface 12b of the lens body 12. In FIG. 4, the recesses 18 and the protrusions 19 are omitted from illustration.

As described above, in the present invention, the width of the annular zones 15A and the width of the annular zones 15B are differentiated, whereby stripe flare 171 can be reduced or made less conspicuous, according to structure (i): the diffraction steps 17A and 17B are provided at positions where the phase difference from the base shape given the design wavelength $\lambda_0$ is 2 nmπ, and positions where it is not 2 nmπ, so that the first face 22A on which edges 20A of the annular zones 15A are located and the second face 22B on which the edges 20B of the annular zones 15B are located are at mutually different positions along the optical axis of the diffraction grating 13. Through a detailed study, it has been found that the effect of reducing stripe flare 171 differs depending on the positions of the diffraction steps 17B.

Figure 5:
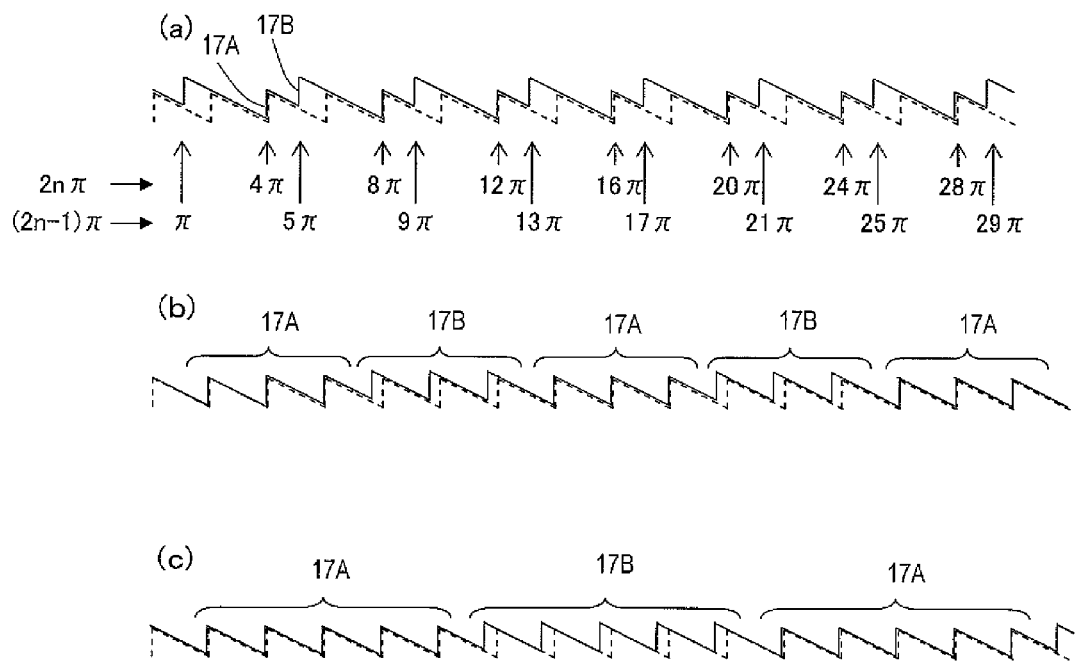
[FIG. 5] (a) to (c) are schematic diagrams showing the positions of annular zones in the first embodiment.

FIGS. 5(a) to (c) are diagrams for facilitating the understanding of the characteristic features of the present invention, showing schematic surface shapes for the diffraction grating 13 based on a phase function assuming linear changes of the phase difference with the radial position. In FIGS. 5(a) to (c), a broken line shows a surface shape of the diffraction grating 13 in the case where the diffraction steps are all provided positions corresponding to 2 nmπ. In FIG. 5, the recesses 18 and the protrusions 19 are omitted from illustration.

According to a detailed study, in order to reduce stripe flare 171 occurring at positions away from the main converged position, as shown in FIG. 5(a), it is preferable to provide diffraction steps 17A at positions where the phase difference from the base shape is 2 nmπ and provide diffraction steps 17B at positions where the phase difference from the base shape is $(2n-1)m\pi$ (FIG. 5(a) illustrates the case where m=1). With this construction, diffraction patterns of Fraunhofer diffraction which occur due to the annular zones 15A and 15B having two different annular zone widths interfere with each other, whereby stripe flare 171 can be effectively reduced.

Moreover, in order to allow stripe flare 171 occurring at any specific position and being conspicuous to be dispersed over a broad range and become less conspicuous, as shown in FIG. 5(b) or (c), it is preferable that the diffraction steps 17A and the diffraction steps 17B are disposed in successive units of i and j, respectively, such that the i diffraction steps 17A alternate with the j diffraction steps 17B. FIG. 5(b) shows a surface shape of a diffraction grating 13 in the case where i=j=3, and FIG. 5(c) shows a surface shape of the diffraction grating 13 in the case where i=j=4. With such constructions, stripe flare 171 occurs with various stripe intervals, which results in a smaller bright-dark contrast of the stripes, whereby the stripe flare 171 is made less conspicuous.

There are no particular limitations as to the numbers i and j of successive diffraction steps 17A and 17B, and the number i of diffraction steps 17A may be different from the number j of diffraction steps 17B. Preferably, i and j are not less than two, and not more than ½ of the number of annular zones in the effective diameter. In order to effectively suppress stripe flare 171, it is preferable that i and j are equal.

Next, structure (ii) will be described. As shown in FIG. 2(d), in each annular zone 15A or 15B of a diffraction grating lens which is designed according to FIGS. 2(a) to (c), a recess 18 is provided at the inner end portion 15AE or 15BE, and a protrusion 19 is provided at the outer end portion 15AE or 15BE. The recess 18 and the protrusion are provided in portions respectively of the inner end portion 15AE or 15BE and the outer end portion 15AE or 15BE, and preferably across the entire inner end portion 15AE or 15BE and the entire outer end portion 15AE or 15BE.

Figure 6:
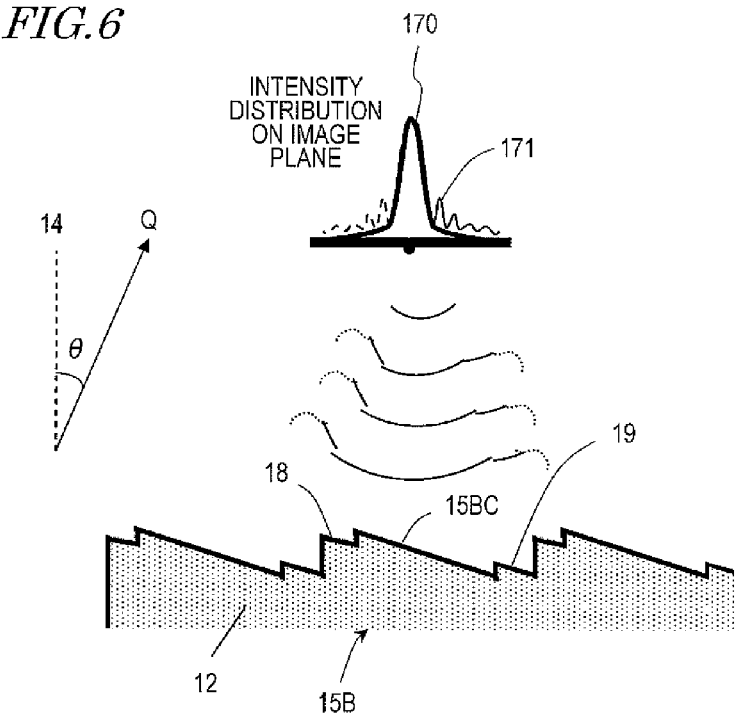
[FIG. 6] A diagram showing a state of a wavefront after transmission through an annular zone in the first embodiment.

FIG. 6 is a cross-sectional view of the neighborhood of the diffraction grating 13 in a plane containing the optical axis 14 of the diffraction grating lens 11. When the refractive index $n_1(\lambda)$ of the lens body 12 is larger than the refractive index $n_2$ of any medium that is in contact with the diffraction grating 13, in the portion of an annular zone 15B of the diffraction grating 13 where the protrusion 19 is provided, the optical path length of light transmitted through the lens body 12 is made correspondingly longer by the protrusion 19. Conversely, in the portion where the recess 18 is provided, the optical path length of light transmitted through the lens body 12 is made correspondingly shorter by the recess 18. As a result, within the light transmitted through the annular zone 15B, the wavefront of the light which is transmitted through the recess 18 located at the inner end portion 15AE or 15BE of the annular zone 15 is advanced relative to the wavefront of the light transmitted through the intermediate portion 15BC of the annular zone 15B. Moreover, the wavefront of the light which is transmitted through the protrusion 19 located at the outer end portion 15AE or 15BE of the annular zone 15B is retarded relative to the wavefront of the light transmitted through the intermediate portion 15BC of the annular zone 15B. The light transmitted through an annular zone 15A also has its wavefront position changed in similar manners.

Since stripe flare 171 occurs due to a bending-around of the wavefront of light transmitted through a narrow annular zone of the diffraction grating, due to phase modulation such as retardation and advancement of the wavefront introduced by the protrusion 19 and the recess 18, the direction of travel of the wavefront of the light which has bent around changes at both end portions 15AE or 15BE of the annular zone. In the present embodiment, the direction of travel of the wavefront of the light which has bent around changes toward the outer side, i.e., in the direction of arrow Q, with respect to the direction of the light which is transmitted and travels through the intermediate portion 15AC or 15BC of the annular zone. On the other hand, the direction of travel of the wavefront of the light which is transmitted through and diffracted by the intermediate portion 15AC or 15BC of each annular zone 15A or 15B does not change.

FIG. 6 shows the wavefront of transmitted light of the case where light which is parallel to the optical axis 14 is transmitted through the annular zones 15A and 15B; however, phase modulation by the protrusion 19 and the recess also occurs when light which is not parallel to the optical axis 14 is transmitted through the annular zones 15A and 15B. In other words, in the present embodiment, the direction of travel of the wavefront of the light which has bent around changes toward the outer side (in the direction of arrow Q) at both end portions 15AE or 15BE of an annular zone 15A or 15B also in the case where light which is not parallel to the optical axis 14 is transmitted through the annular zone 15A or 15B, with respect to the direction of travel of the wavefront of the light which is transmitted and travels through the intermediate portion 15AC or 15BC of the annular zone 15A or 154B.

As a result of this, the converged position of stripe flare 171 on an imaging sensor is shifted in the outer direction (i.e., the peripheral direction on the captured image), so that a portion of the image of the stripe flare 171 overlaps an image 170 of the light source. As a result, a cumulative light amount of stripe flare occurring in the neighborhood of the light source can be reduced. That is, influences of stripe flare in the resultant captured image can be reduced.

In particular, in the diffraction grating lens 11 of the present embodiment, since the recesses 18 and the protrusions 19 are provided at the inner end portions 15AE and 15BE and the outer end portions 15AE and 15BE of the annular zones 15A and 15B, the direction of travel of the stripe flare 191 can be greatly changed, thus making it possible to effectively reduce the stripe flare 171 on the captured image. In the case where the protrusions and recesses are not inverted between the inner end portions 15AE and 15BE and the outer end portions 15AE and 15BE of the annular zones 15A and 15B, i.e., recesses are formed at both the inner end portions 15AE and 15BE and the outer end portions 15AE and 15BE, or protrusions are formed at both, the changes in the phase of the wavefront due to the protrusion/recess shapes will be canceled, and the changes in the direction of travel of the wavefront will also become small. This will result in a smaller effect of reducing stripe flare 171.

Moreover, the effect of suppressing stripe flare 191 by the provision of the recesses 18 and the protrusions is obtained by changing the phase of the wavefront of light which has been transmitted through both end portions 15AE or 15BE of the annular zone 15A or 15B and bent around. Therefore, it is preferable that the direction of travel of light transmitted through both end portions 15AE or 15BE does not change greatly due to refraction at the faces composing the recesses 18 and the protrusions 19. Specifically, it is preferable that the bottom faces of the recesses 18 and the upper faces of the protrusions 19 are approximately parallel to the slopes of the intermediate portions 15AC and 15BC of the annular zones 15A and 15B. If the slope of an intermediate portion 15AC or 15BC constitutes an angle greater than 10 degrees with the bottom face of a recess 18 or the upper face of a protrusion 19, the direction of travel of light transmitted through both end portions 15AE or 15BE will have large changes, so that not only sufficient attainment of the aforementioned effects of the present invention will be hindered, but also unwanted stray light will occur, thus causing a different kind of flare than stripe flare 191.

In order to allow sufficient changes in phase for reducing the influences of stripe flare 171 on the captured image to be generated by structure (ii), it is preferable, as shown in FIG. 1C, that widths WA1, WB1 and WA2, WB2 of the recesses 18 and the protrusions 19 along a direction which is on a plane containing the optical axis 14 of the diffraction grating 13 and which is perpendicular to the optical axis are 5% or more of the width WA or WB of the annular zone 15A or 15B along a direction which is on a plane containing the optical axis of the diffraction grating 13 and which is perpendicular to the optical axis, respectively. Herein, in the case where the recesses 18 or the protrusions 19 do not have a uniform width WA1, WB1 or WA2, WB2 along the optical axis direction, the largest width of each recess 18 or protrusion 19 along the optical axis direction is defined as the width WA1, WB1 or WA2, WB2.

On the other hand, the recesses 18 and the protrusions 19 may be factors that reduce the bundle of rays to be converged at the converged position inherent in diffraction (decrease in diffraction power), thus causing aberration. Moreover, since the changes in the phase introduced by the recesses 18 and the protrusions 19 generate a component with an advanced phase and a component with a retarded phase relative to the diffracted light which should inherently contribute to convergence, there is a possibility that the wavelength dependence of the diffraction efficiency may be disturbed, and diffracted light of unwanted orders may be generated. In order to suppress deteriorations in image quality due to the occurrence of such aberration or diffracted light of unwanted orders, it is preferable that the widths WA1, WB1 and WA2, WB2 of the recesses 18 and the protrusions 19 along a direction which is on a plane containing the optical axis 14 of the diffraction grating 13 and which is perpendicular to the optical axis are 25% or less of the width WA or WB of the annular zone 15A or 15B along a direction which is on a plane containing the optical axis 14 of the diffraction grating 13 and which is perpendicular to the optical axis, respectively. Therefore, it is preferable that the widths WA1, WB1 and WA2, WB2 of the recesses 18 and the protrusions 19 along a direction which is on a plane containing the optical axis of the diffraction grating 13 and which is perpendicular to the optical axis have values in the range of no less than 5% and no more than 25% of the width WA or WB of the annular zone 15A or 15B along a direction which is on a plane containing the optical axis 14 of the diffraction grating 13 and which is perpendicular to the optical axis, respectively.

Moreover, if the height (depth) dA2, dB2 of the recess 18 and the height dA1, dB1 of the protrusion 19 along a direction parallel to the optical axis are too small, the phase difference will become small, such that stripe flare 171 cannot be sufficiently reduced. On the other hand, if the height dA2, dB2 and the height dA1, dB1 are too large, as is the case with the widths of the recesses 18 and the protrusions 19, the diffraction power will decrease, and deteriorations in image quality will occur due to diffracted light 156 of unwanted orders or aberration. Therefore, it is preferable that the height dA2, dB2 of the recesses 18 and the height dA1, dB1 of the protrusions 19 are in the range of no less than 3% and no more than 20% of the design step length d (=dA, dB) of the diffraction steps, respectively. Herein, in the case where the recesses 18 or the protrusions 19 do not have a uniform height dA1, dB1 or dA2, dB2 along a direction perpendicular to the optical axis, the largest height of each recess 18 or protrusion 19 along the direction perpendicular to the optical axis is defined as the height dA1, dB1 or dA2, dB2.

The widths WA1, WB1 and WA2, WB2 of the recesses 18 and the protrusions 19 may be equal to or different from each other, so long as the values are within the aforementioned range. Moreover, among the plurality of annular zones 15A and 15B, the width WA1, WB1 of the recesses 18 and the width WA2, WB2 of the protrusions 19 may be all equal or different. Similarly, the heights dA1, dB1 and the dA2, dB2 of the recesses 18 and the protrusions 19 may be equal to or different from each other. Moreover, among the plurality of annular zones 15A and 15B, the height dA1, dB1 of the recesses 18 and the height dA2, dB2 of the protrusions 19 may be all equal or different.

Figure 7:
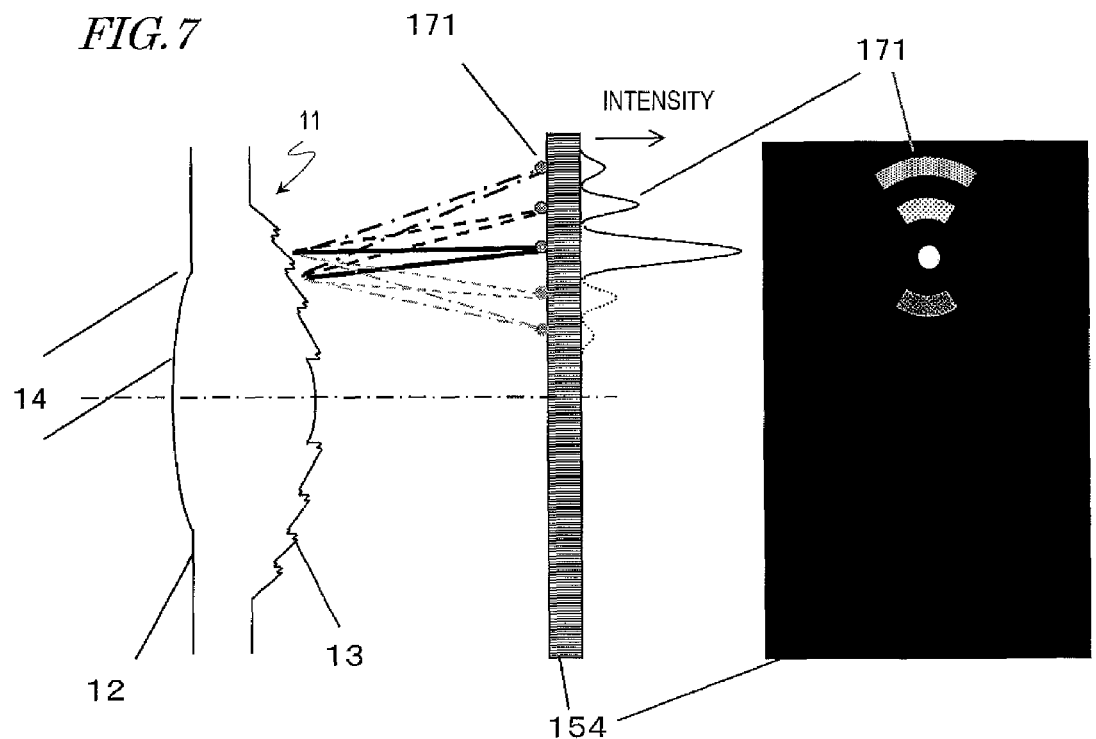
[FIG. 7] A diagram showing a shape of stripe flare occurring on an imaging sensor 154, onto which a bundle of rays having passed through annular zones is converged, in the first embodiment.

Through image evaluations using an actual lens, the inventors have confirmed that structure (ii), i.e., forming the recesses 18 and the protrusions 19 in the annular zones 15A and 15B, induces a change in the converged position of stripe flare 171 as compared to the case where they are not formed. FIG. 7 schematically shows stripe flare 171 in an image which is captured by an imaging sensor 154, in the case where the diffraction grating lens 11 is disposed so that the diffraction grating 13 is located closest to the imaging sensor. As will be clear from a comparison with the distribution of stripe flare 171 in a conventional imaging device shown in FIG. 21, when a light source is disposed so that an intense light source will appear at the image periphery, for example, using the diffraction grating lens 11 of the present embodiment allows the intensity of the stripe flare 171 toward the image central portion to be lowered relative to the image of the light source. This is because the converged position of stripe flare 171 is shifted in the outer direction on the imaging plane, so that a portion of the image of stripe flare overlaps the image of the light source.

Thus, the diffraction grating lens of the present embodiment has structure (i). Specifically, one of the two kinds of diffraction steps of the diffraction grating 13 are provided at positions where the phase difference from the base shape given the design wavelength $\lambda_0$ is not 2 nm$\pi$. In other words, one of the two kinds of diffraction steps have an edge located on a first face which results from translating a base shape along an optical axis direction of the diffraction grating, and at least one of the other diffraction steps has an edge located on a second face which results from translating the base shape along the optical axis direction, the first face and the second face being at respectively different positions along the optical axis. As a result, two kinds of annular zones with different annular zone widths will be included in the diffraction grating, so that stripes of flare caused by the two kinds of annular zones with different annular zone widths interfere with each other, whereby occurrence of stripe flare is suppressed.

Moreover, the diffraction grating lens of the present embodiment has structure (ii). Specifically, either one of recesses or protrusions are provided at the inner end portions 15AE and 15BE of annular zones, and the others are provided at the outer end portions 15AE and 15BE. As a result, the position at which stripe flare occurs is shifted; and a portion of the stripe flare can be allowed to overlap an image of a light source on the captured image, or the converged position of a portion of stripe flare can be shifted in the outer direction on the imaging plane. Therefore, the cumulative light amount of stripe flare light occurring in the neighborhood of the light source can be reduced, and the influences of stripe flare appearing in the captured image can be suppressed.

Therefore, in accordance with the diffraction grating lens of the present embodiment, based on these two structures, occurrence of stripe flare can be suppressed and the influences of stripe flare appearing in the captured image can be suppressed.

In the present embodiment above, in order to shift the position at which stripe flare 171 occurs in the peripheral direction on a captured image, the recesses 18 are provided at the inner end portions 15AE and 15BE of the annular zones 15A and 15B; the protrusions 19 are provided at the outer end portions 15AE and 15BE; and the diffraction grating 13 is provided on the imaging sensor 154 side. Since more important information is likely to be located at the central portion of a captured image in many applications of the diffraction grating lens 11 of the present embodiment, shifting the stripe flare 171 in the peripheral direction on the captured image can suppress deteriorations in image quality due to stripe flare, and makes it possible to obtain a high quality image. However, depending on the application, important information may be located at the image periphery of an image of a light source that is converged by the diffraction grating lens 11, and it may be better to shift stripe flare in the central direction on the captured image. Moreover, depending on the position at which the diffraction grating lens 11 is disposed, the shift direction of stripe flare will be the reverse of what is desired.

In such cases, in the diffraction grating lens 11 shown in FIGS. 1A, 1B, and 1C, the positions of the recesses 18 and the protrusions 19 may be exchanged.

Figure 8:
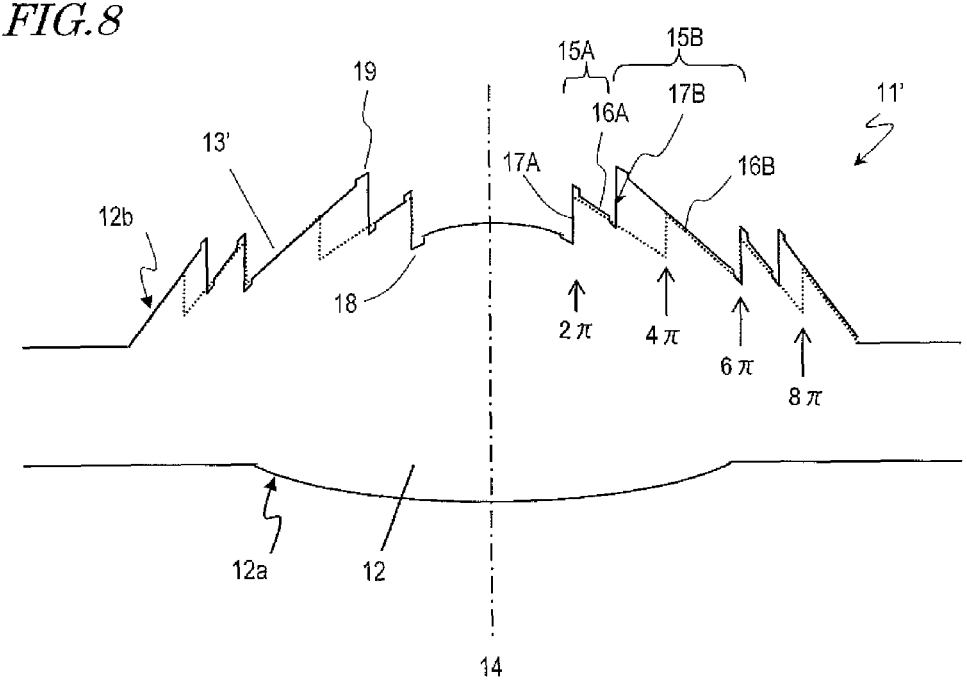
[FIG. 8] A cross-sectional view showing a variant of the first embodiment.
Figure 9:
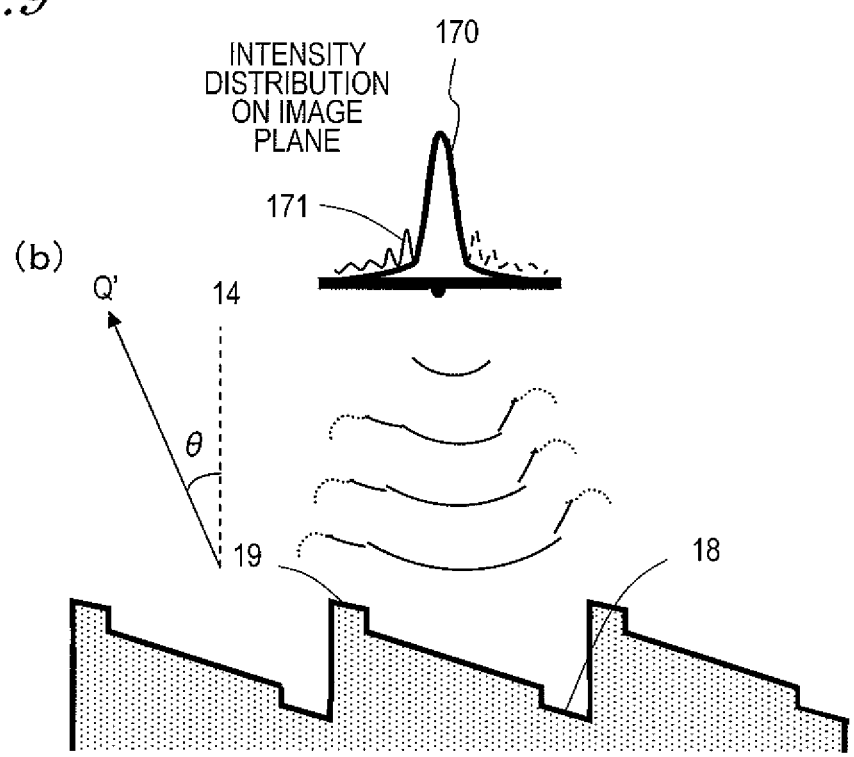
[FIG. 9] A diagram showing a state of a wavefront after transmission through an annular zone in the diffraction grating shown in FIG. 8.

Specifically, as shown in FIG. 8, in the annular zones 15A and 15B, protrusions 9 may be provided at the inner end portions 15AE and 15BE, and recesses 18 may be provided at the outer end portions 15AE and 15BE. As shown in FIG. 9, in an annular zone, at the portion where the protrusion 19 is provided, the optical path length of light transmitted through the lens body is made correspondingly longer by the protrusion 19. Conversely, at the portion where the recess 18 is provided, the optical path length of light transmitted through the lens body is made correspondingly shorter by the recess 18. As a result, within the light transmitted through each annular zone, the wavefront of the light which is transmitted through the recess 18 located at the outer end portion 15AE or 15BE of the annular zone is advanced relative to the wavefront of the light transmitted through the intermediate portion of the annular zone. Moreover, the wavefront of the light which is transmitted through the protrusion 19 located at the inner end portion 15AE or 15BE of the annular zone is retarded relative to the light transmitted through the intermediate portion of the annular zone. Consequently, at both ends of the annular zone, the direction of travel of the wavefront of the light which has bent around changes so that the direction of travel of the wavefront of the light which has bent around is changed toward the inner side, i.e., in the direction of arrow Q', with respect to the direction of the light which is transmitted and travels through the intermediate portion of the annular zone. On the other hand, the direction of travel of the wavefront of the light which is transmitted through and diffracted by the intermediate portion of each annular zone does not change. As a result of this, the converged position of stripe flare 171 on the imaging sensor is shifted in the inner direction (i.e., the central direction on the captured image), so that a portion of the image of the stripe flare 171 overlaps an image 170 of the light source. As a result, the intensity of the stripe flare 171 in the periphery on the imaging sensor can be reduced.

In the diffraction grating lens of the present embodiment described above, the recesses 18 and the protrusions 19 provided in the annular zones have a rectangular cross-sectional shape in a plane containing the optical axis. The recesses 18 and the protrusions 19 may have cross-sectional shapes other than rectangular shapes.

Figure 10:
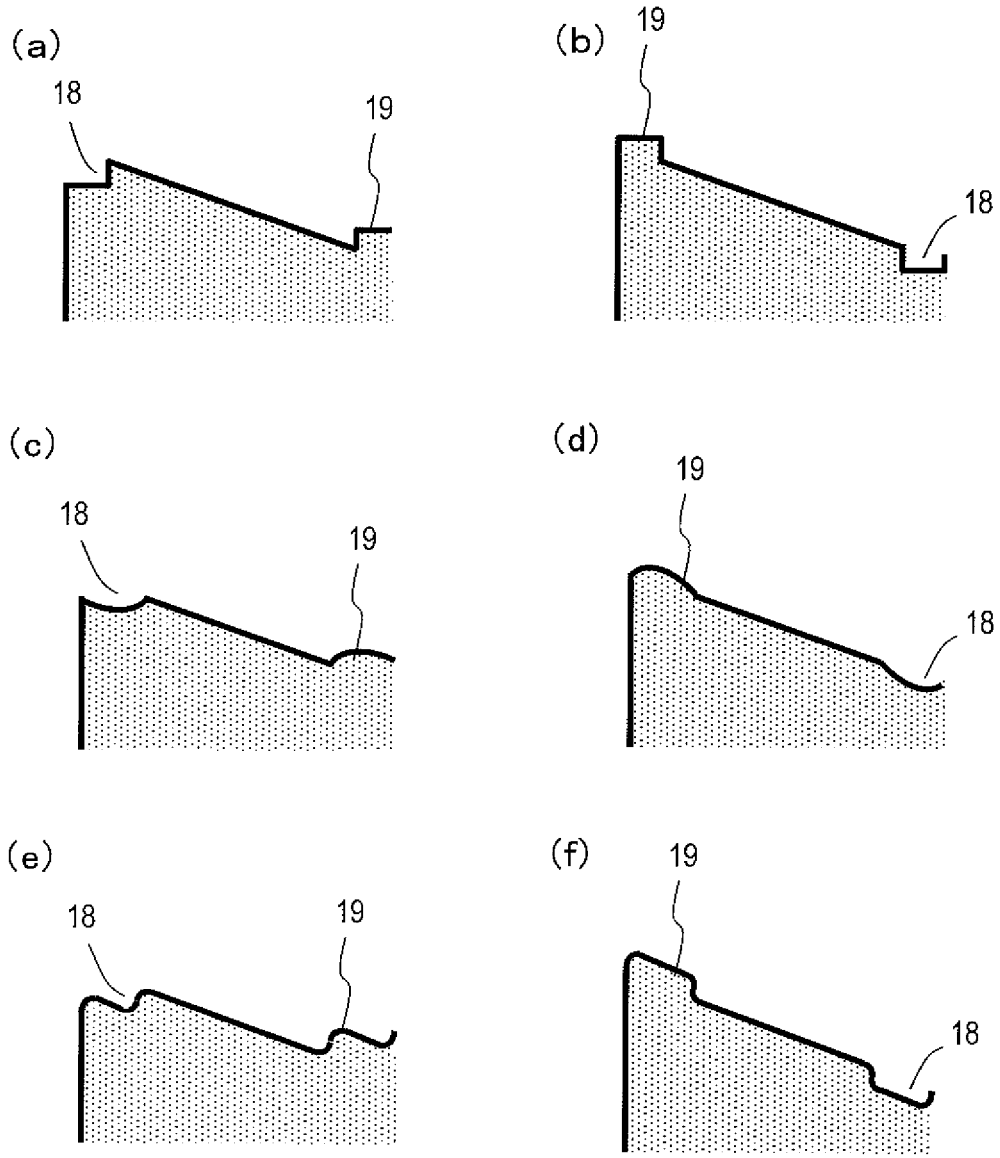
[FIG. 10] (a) to (f) show other exemplary cross-sectional shapes of the diffraction grating of the first embodiment

FIGS. 10(a) to (f) show examples of cross-sectional shapes of the annular zones 15A and 15B of the diffraction grating lens 11 of the present embodiment. As described above, the recesses 18 and the protrusions 19 may have a rectangular cross-sectional shape in a plane containing the optical axis of the diffraction grating lens 1, as shown in FIGS. 10(a) and (b). Or, as shown in FIGS. 10(c) and (d), the bottom of each recess 18 may have a cross-sectional shape with a concave arc, and an upper portion of each protrusion 19 may have a cross-sectional shape with a protruding arc. Furthermore, as shown in FIGS. 10(e) and (f), the recesses 18 and the protrusions 19 may have a rectangular cross-sectional shape with rounded corners. However, for the aforementioned reasons, it is preferable that the angles which the principal planes composing the bottom face of each recess 18 and the upper face of each protrusion 19 constitute with the slope of the intermediate portion 15AC or 15BC are equal to or less than 10 degrees.

In the present embodiment, the recesses 18 and the protrusions 19 are provided in all of the annular zones 15A and 15B. However, it would be possible to particularly suppress the influences of stripe flare at a desired position on the captured image by providing the recesses 18 and the protrusions 19 in only either the annular zones 15A or the annular zones 15B, or in only some of the annular zones 15A and 15B. Moreover, the recesses 18 and the protrusions 19 may be provided only in portions of the inner end portions and the outer end portions of the annular zones, so as to suppress stripe flare in a specific direction on the captured image. Moreover, in the case where light enters a partial region of the diffraction grating of the diffraction grating lens through a diaphragm or the like, i.e., in the case where a part of the region in which the diffraction grating is provided defines an effective region, it suffices if the recesses 18 and the protrusions 19 are provided in portions that are within the effective region of each annular zone.

(Second Embodiment)

Figure 11:
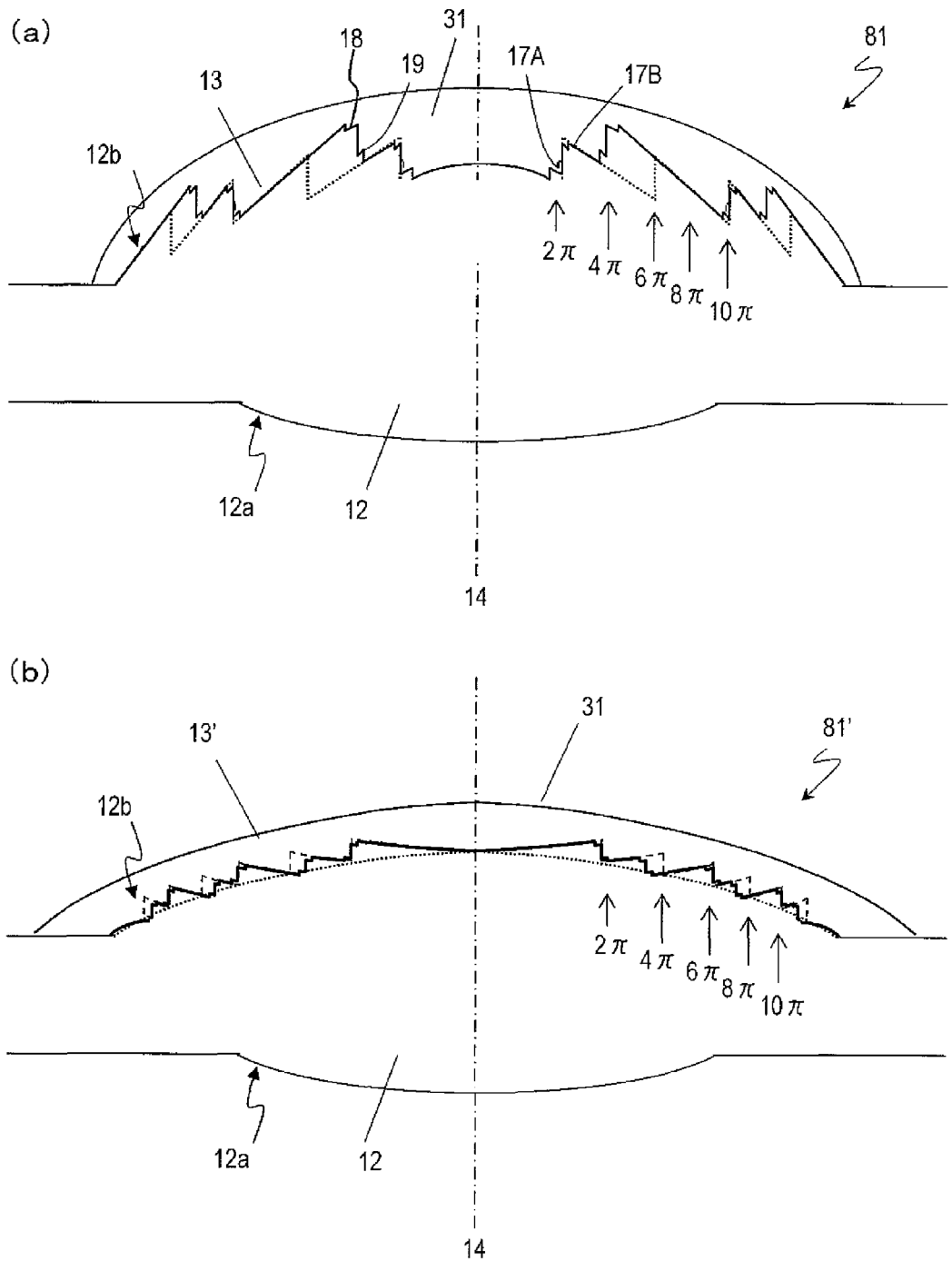
[FIG. 11] (a) is a cross-sectional view showing a second embodiment of a diffraction grating lens according to the present invention, and (b) is a cross-sectional view showing a variant thereof.

Hereinafter, a second embodiment of the diffraction grating lens according to the present invention will be described. FIG. 11(a) is a cross-sectional view showing a second embodiment of the diffraction grating lens according to the present invention. A diffraction grating lens 81 shown in FIG. 11(a) includes a lens body 12, a diffraction grating 13 provided on the lens body 12, and an optical adjustment layer 31 provided on the lens body 12 so as to cover the diffraction grating 13. The lens body 12 has a first surface 12a and a second surface 12b, with the diffraction grating 13 being provided on the second surface 12b. Preferably, an optical adjustment layer 31 is provided so as to completely bury the diffraction steps of the diffraction grating 13.

The diffraction grating 13 and the lens body 12 are similar in structure to those of the diffraction grating lens 11 of the first embodiment.

As in the first embodiment, the lens body 12 is composed of a first material having a refractive index $n_1(\lambda)$ at a used wavelength $\lambda$. The optical adjustment layer 31 is composed of a second material having a refractive index $n_2(\lambda)$ at the used wavelength $\lambda$.

The condition which must be satisfied by the diffraction steps of the diffraction grating lens 81 is obtained by replacing the refractive index of air, i.e., 1, with the refractive index of the optical adjustment layer 31 in the aforementioned eq. (3). Specifically, given a linear step length d of the diffraction steps 17A and 17B of the diffraction grating 13 and an order of diffraction m, the design step length d of the diffraction steps, the refractive index $n_1(\lambda)$ of the lens body 12 and the refractive index $n_2(\lambda)$ of the optical adjustment layer 31 satisfy the relationship of eq. (4) below.

$$0.9d \le \frac{m \cdot \lambda}{n_1(\lambda) - n_2(\lambda)} \le 1.1d \quad (4)$$

Preferably, the used wavelength $\lambda$ is a wavelength in the visible light region, and eq. (4) is satisfied with respect to any wavelength $\lambda$ in the entire visible light region. In this case, since light of any arbitrary wavelength $\lambda$ in the visible light region satisfies eq. (4), diffracted light of unwanted orders does not occur, so that the wavelength dependence of diffraction efficiency becomes very small and a high diffraction efficiency is obtained.

In order for light of any arbitrary wavelength $\lambda$ in the visible light region to satisfy eq. (4), a first material with a refractive index $n_1(\lambda)$ and a second material having the refractive index $n_2(\lambda)$, each having a wavelength dependence such that d is approximately constant at any arbitrary wavelength $\lambda$ in the visible light region or the wavelength band of light used, may be combined. Generally speaking, a material having a high refractive index and a low wavelength dispersion and a material having a low refractive index and a high wavelength dispersion are to be combined.

More specifically, a material whose wavelength dependence of refractive index shows an opposite tendency to that of the wavelength dependence of refractive index of the first material may be selected as the second material. For example, in the wavelength range of light for which the diffraction grating lens 11 is used, the refractive index of the second material is smaller than the refractive index of the first material, and the wavelength dispersion of refractive index of the second material is greater than the wavelength dispersion of refractive index of the first material. In other words, it is preferable that the second material is a material with a lower refractive index and a higher dispersion than the first material.

As the first material and the second material, composite materials obtained by dispersing inorganic particles in glass or resin may be used. Composite materials can be suitably used as the first material and the second material because the refractive index and wavelength dispersion of the entire composite materials are adjusted by adjusting the type of inorganic particles or the like to be dispersed, the size of particles, and the added amount.

When the refractive index $n_2(\lambda)$ is greater than the refractive index $n_1(\lambda)$, d has a negative value. In this case, the second surface 12b shape of the diffraction grating 13 is obtained by inverting a phase difference based on a phase function and adding it to a base shape. FIG. 11(b) shows a structure of a diffraction grating 13' in the case where the refractive index $n_2(\lambda)$ is greater than the refractive index $n_1(\lambda)$.

As described above, the diffraction grating lens 81 of the present embodiment differs from the diffraction grating lens 11 of the first embodiment in that the diffraction grating 13 is covered by the optical adjustment layer 31; however, the diffraction grating lens 11 and the diffraction grating lens 81 may be regarded as the same structure if the optical adjustment layer 31 is an air layer. As is clear from comparison between eq. (4) and eq. (3), the refractive index $n_2(\lambda)$ of the second material, being an optical material, is generally greater than 1, so that the design step length d will become larger than that of the diffraction grating lens 11 of the first embodiment. However, occurrence of a diffraction pattern due to Fraunhofer diffraction and the effect of suppressing stripe flare 171 according to the present invention do not depend on wavelength. Therefore, even through the diffraction grating is covered by the optical adjustment layer 31 in the diffraction grating lens 181 of the present embodiment, occurrence of stripe flare 171 is suppressed by structures (i) and (ii) as in the first embodiment, and the influences of stripe flare in the resultant captured image can be suppressed. Moreover, when eq. (4) is satisfied in the entire wavelength range of use, flare associated with diffracted light of unwanted orders can also be reduced.

(Third Embodiment)

Figure 12:
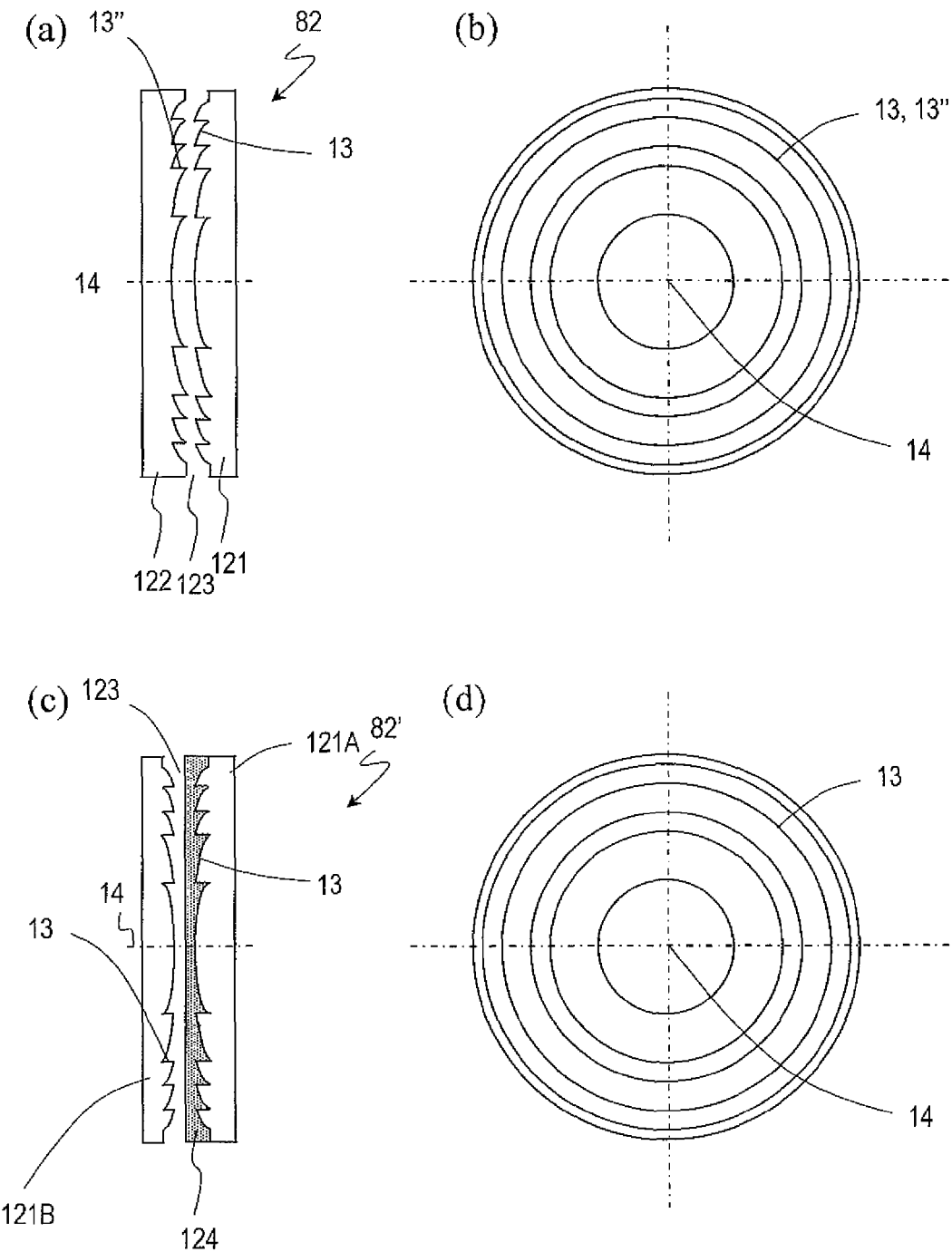
[FIGS. 12] (a) and (b) are a cross-sectional view and a plan view showing an embodiment of an optical element according to the present invention; and (c) and (d) are a cross-sectional view and a plan view showing another embodiment of an optical element according to the present invention.

An embodiment of an optical element according to the present invention will be described. FIG. 12(a) is a schematic cross-sectional view showing an embodiment of an optical element according to the present invention, and FIG. 12(b) is a plan view thereof. The optical element 82 includes a diffraction grating lens 121 and a diffraction grating lens 122. The diffraction grating lens 121 is the diffraction grating lens 11 of the first embodiment, for example, and has a diffraction grating 13 of the structure described in the first embodiment provided thereon. The diffraction grating lens 122 has a diffraction grating 13' of the structure shown in FIG. 11(b) of the first embodiment provided thereon. The diffraction grating lens 121 and the diffraction grating lens 122 are retained via a predetermined gap 123 therebetween.

FIG. 12(c) is a schematic cross-sectional view showing another embodiment of the optical element according to the present invention, and FIG. 12(d) is a plan view thereof. An optical element 82' includes a diffraction grating lens 121A, a diffraction grating lens 121B, and an optical adjustment layer 124. On one face of the diffraction grating lens 121A, a diffraction grating 13 having the structure described in the first embodiment is provided. Similarly, a diffraction grating 13 is provided on the diffraction grating lens 121B. An optical adjustment layer covers the diffraction grating 13 on the diffraction grating lens 121A. The diffraction grating lens 121A and the diffraction grating lens 121B are retained so that a gap 23 is created between the diffraction grating 13 provided on the surface of the diffraction grating lens 121B and the optical adjustment layer 24.

In the optical element 82 and optical element 82', in which diffraction grating lenses are stacked, since the diffraction gratings have structures (i) and (ii) as described in the first embodiment, the influences of stripe flare are suppressed, and the influences of stripe flare appearing in the captured image can be suppressed.

(Fourth Embodiment)

Figure 13:
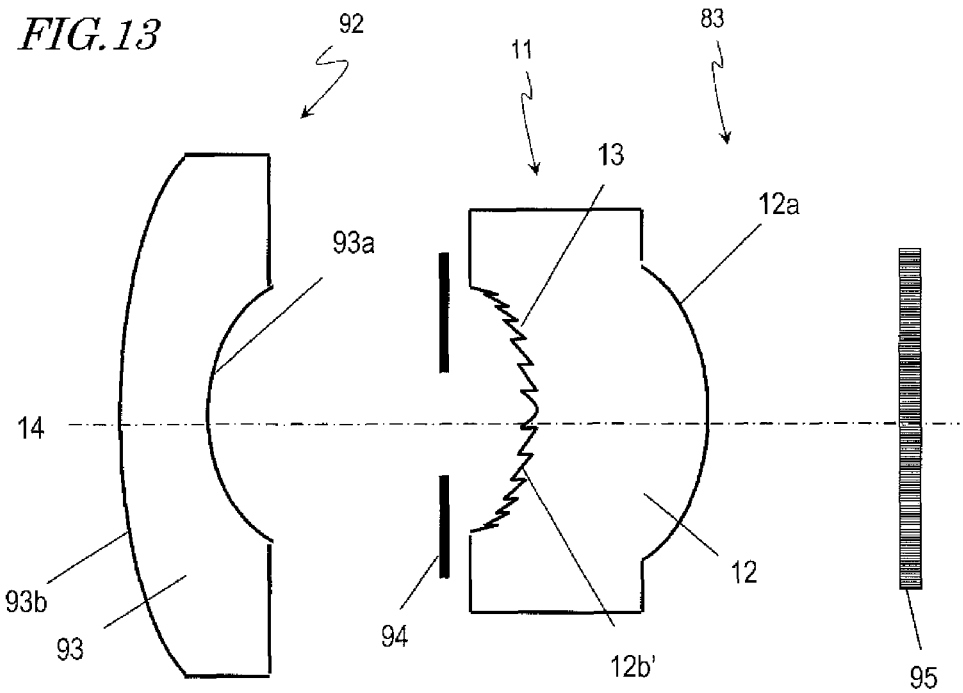
[FIG. 13] A schematic cross-sectional view showing an embodiment of an imaging device according to the present invention.

FIG. 13 is a schematic cross-sectional view showing an embodiment of an imaging device according to the present invention. The imaging device 83 includes a lens 92, a diffraction grating lens 11, a diaphragm 94, and an imaging sensor 95.

The lens 92 includes a lens body 93. A first surface 93a and a second surface 93b of the lens body 93 have known lens surface shapes, e.g., spherical or aspherical. In the present embodiment, the first surface 93a of the lens body 93 has a concave shape, and the second surface 93b has a convex shape.

The diffraction grating lens 11 includes a lens body 12. The base shapes of a first surface 12a and a second surface 12b' of the lens body 12 have known lens surface shapes, e.g., spherical or aspherical. In the present embodiment, the first surface 12a has a convex shape, and the second surface 12b' has a concave shape. On the second surface 12b', the diffraction grating 13 described in the first embodiment is provided.

Light from a subject, which enters through the second surface 93b of the lens 92, is converged by the lens 92 and the diffraction grating lens 11, and forms an image on the surface of the imaging sensor 95, so as to be converted into an electrical signal by the imaging sensor 95.

The imaging device 83 of the present embodiment has two lenses, including the diffraction grating lens 11. However, there are no particular limitations to the number of lenses and the lens shapes; there may be one lens, or three or more lenses. By increasing the number of lenses, the optical performance can be improved. In the case where the imaging device 83 includes a plurality of lenses, the diffraction grating 13 may be provided on any of the plurality of lenses. The face on which the diffraction grating 13 is provided may be at the subject side, or at the imaging side; or there may be a plurality of such faces. However, it is particularly preferable that the diffraction grating 13 is provided only on one face because the diffraction efficiency will be lowered if a plurality of diffraction gratings 13 are provided. It is not necessary that the annular zone shapes of the diffraction grating 13 are disposed in concentric circles around the optical axis 14. However, in order to achieve good aberration characteristics in the imaging optics, it is desirable that the annular zone shapes of the diffraction grating 13 are rotation symmetrical with respect to the optical axis 14. Moreover, the diaphragm 94 may be disposed at any arbitrary position for allowing the characteristics of the imaging device 83 to be exhibited, or may be omitted.

Since the imaging device of the present embodiment includes the diffraction grating lens 11 having the diffraction grating 13 described in the first embodiment provided thereon, an image with little stripe flare 171 can be obtained even when imaging an intense light source.

(Fifth Embodiment)

An embodiment of a production method for a diffraction grating lens according to the present invention will be described.

First, a diffraction grating lens having the diffraction grating 13 described in the first embodiment will be described.

When producing the lens body 12 via molding, the shapes of the recesses 18 and the protrusions 19 may be previously formed in the mold together with the annular zone shapes, whereby the recesses 18 and the protrusions 19 can be formed on the annular zones at the same time as producing the lens body 12 having the annular zone shapes. For the formation of the shapes of the recesses 18 and the protrusions 19 in the mold, cutting by using a diamond bit or the like, grinding by using a hone or the like, etching, transfer from a master mold, or other techniques can be used. For the molding, injection molding, press forming, cast molding, or the like can be used.

According to this production method, there is no need to separately form the recesses 18 and protrusions 19 on each diffraction grating lens, and the annular zone shapes and the recesses 18 and protrusions 19 can be integrally formed, thus resulting in a very high producibility. Moreover, various resins and glasses are usable as the material of the lens body 12, e.g., thermoplastic resins, thermosetting resins, energy beam-curing resins, or glasses for low-temperature molding, so that an appropriate lens body material can be selected based on the application and the like.

In the case of producing the lens body 12 via cutting or polishing, the shapes of the recesses 18 and the protrusions 19 may be processed at the same time as forming the annular zone shapes through cutting. In this case, for ease of shape processing, it is particularly preferable to use a thermoplastic resin, e.g., polycarbonate, alicyclic olefin resin, or PMMA, as the material of the lens body 12.

Otherwise, after forming the lens body 12 having the annular zone shapes via molding or the like, recesses 18 may be formed for the annular zones by employing etching, laser lithography, electron beam lithography, or the like, and protrusions 19 may be formed by introducing the lens body material onto the annular zone shapes via application, printing, or the like. Alternatively, the entire lens body 12 having the annular zone shapes complete with the recesses 18 and the protrusions 19 may be formed via optical forming or the like.

Although round shapes associated with the molding conditions or the bit shape used for the cutting might be conferred to the recesses 18 and the protrusions 19 which are formed on the annular zones by the aforementioned methods, this is not particularly problematic so long as the captured image does not suffer deterioration in image quality. The diffraction grating lens of the first embodiment can be produced by the aforementioned methods.

In the case of producing the diffraction grating lens of the second embodiment, a step of forming the optical adjustment layer 31 so as to cover the diffraction grating 13 of the diffraction grating lens produced by the aforementioned methods is carried out.

As has also been discussed in the second embodiment, the diffraction grating lens of the second embodiment has a relatively long diffraction step length d, as compared to the first embodiment. Therefore, the recesses 18 and the protrusions 19 also have increased heights, which facilitates formation via molding or cutting, and makes it possible to efficiently produce a lens in which the influences of stripe flare 171 are effectively suppressed.

As for the material composing the optical adjustment layer 31, there are no particular limitations so long as the material has refractive index characteristics satisfying eq. (4) and sufficient light transmittance, and so long as the material is capable of forming a surface shape which fills over the annular zones and the recesses and protrusions provided on the annular zones without leaving any air gaps and yet does not detract from the lens characteristics. For example, a resin, a glass, a transparent ceramic, a composite material obtained by dispersing inorganic particles in resin, a hybrid material in which an organic component and an inorganic component are combined, or other substances may be used. It is particularly preferable to use a resin, a composite material, or a hybrid material for ease of forming the surface shape of the optical adjustment layer 31.

As the method of forming the optical adjustment layer 31, an appropriate one may be selected from among molding and application, coating, or the like, e.g., screen printing, pad printing, and ink jet technique, depending on the material composing the optical adjustment layer 31 and the required surface shape precision, and so on. The optical adjustment layer 31 may be formed by combining a plurality of steps.

On the surface of the diffraction grating lens of the second embodiment and the diffraction grating lens of the first embodiment having been formed in this manner, a further coating layer may be formed as necessary. Examples of a coating layer include an antireflection layer, a hard coat layer, a wavelength-selecting layer such as an ultraviolet cutting layer or an infrared cutting layer, and so on.

EXAMPLE 1

Figure 14:
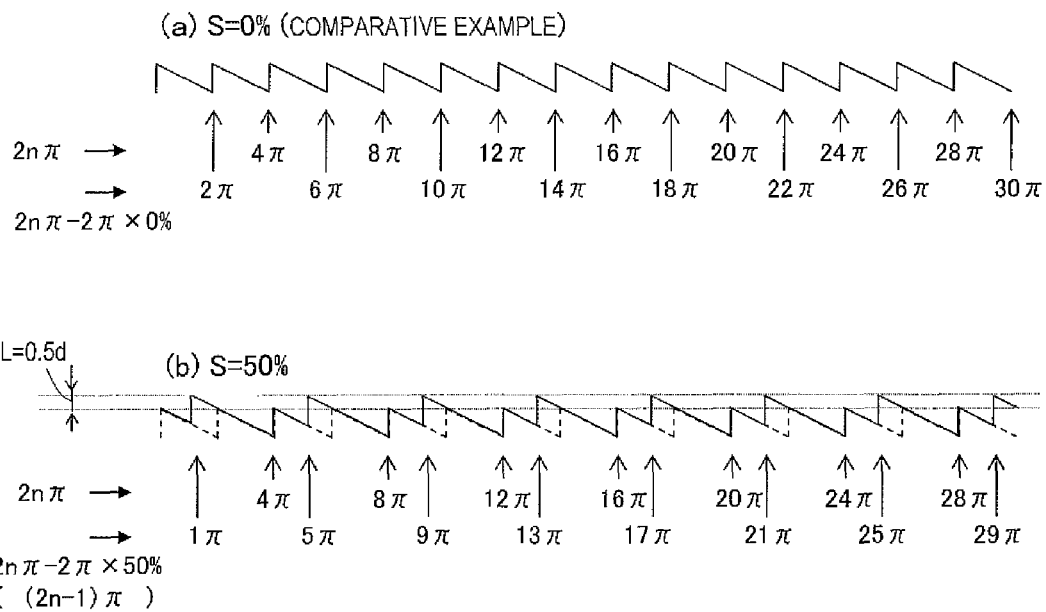
[FIG. 14] A schematic diagram showing the positions of diffraction steps in Example 1.

In this Example, in the diffraction grating lens 11 shown in FIG. 1, diffraction steps 17A were provided at positions corresponding to $2n\pi$, and diffraction steps 17B were provided at positions where the phase difference from the base shape was $(2n\pi - 2\pi \times S)$ (S=0.5). The diffraction steps 17A and 17B were disposed in alternation. FIG. 14 schematically shows a diffraction grating shape in the case where the diffraction steps 17B are provided at positions where the phase difference from the base shape is $(2n\pi - 2\pi \times S)$ (S=0.5). As has been described with reference to FIG. 1B in the first embodiment, when the positions at which the diffraction steps 17B are provided are shifted by $2\pi \times S$ (S=0.5) from $2n\pi$, the interval L between the first face 22A on which the edges 20A of the annular zones 15A according to the design step length are located and the second face 22B on which the edges 20B of the annular zones 15B according to the design step length are located, along the optical axis of the diffraction grating 13, is $d \times S$ (S=0.5).

Figure 2:
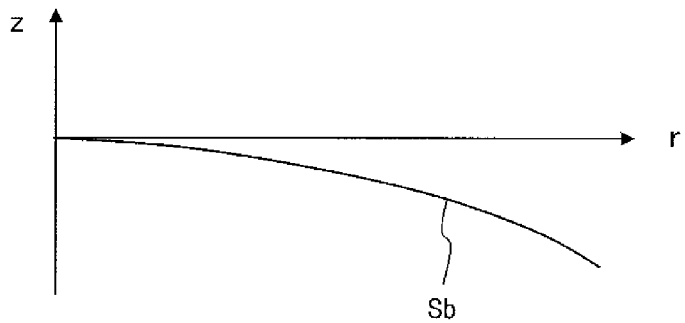
[FIG. 2] (a) to (d) are diagrams showing a method of deriving the shape of a diffraction grating plane of a diffraction grating lens according to the present invention, where (a) is a diagram showing a base shape; (b) is a diagram showing a phase difference function; (c) is a diagram showing the surface shape of a diffraction grating; and (d) is a diagram showing the surface shape of the diffraction grating after recesses and protrusions are formed.
Figure 2:
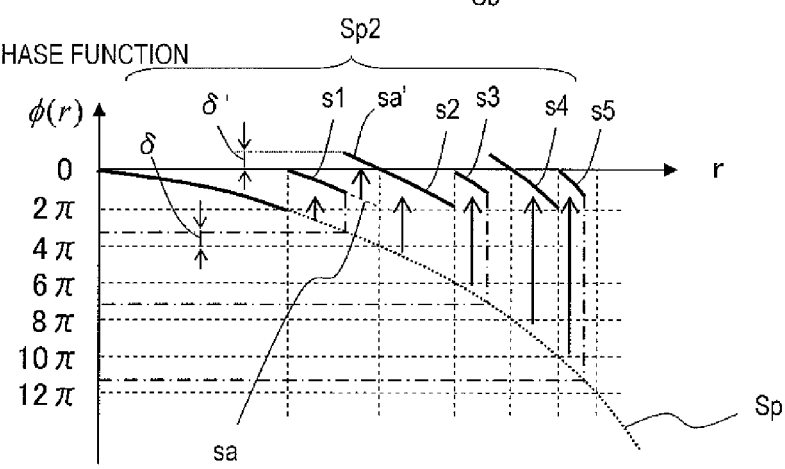
Figure 2:
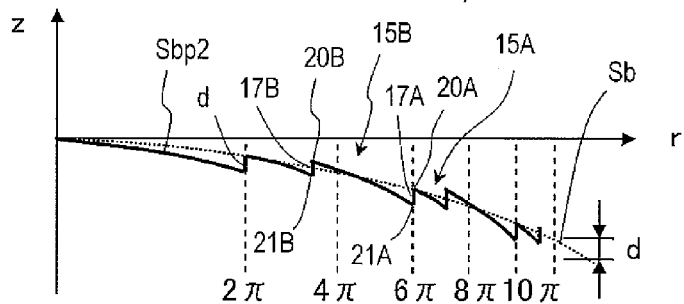
Figure 2:
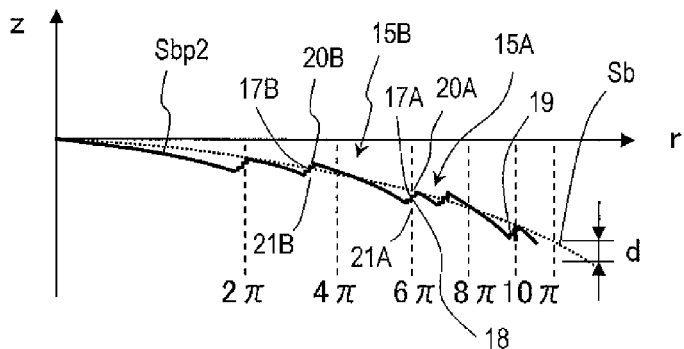

Although FIG. 14 indicates the annular zone pitch to be an equal pitch for convenience, in an actual diffraction grating lens, the diffraction grating is designed by also employing higher-order terms other than a1 in eq. (1), so that the pitch of the diffraction steps varies as shown in FIG. 2(*b*). Moreover, the recesses 18 and the protrusions 19 are omitted from illustration in FIG. 14. The first order was used as the order of diffraction.

Figure 15:
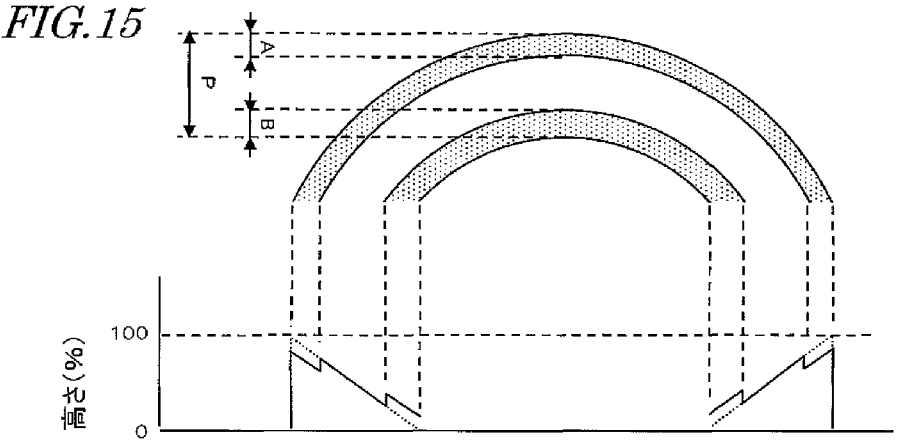
[FIG. 15] A diagram showing one annular zone of the diffraction grating lens of Example 1 as viewed from above, and a diagram showing a height profile of that annular zone.

FIG. 15 is a diagram showing one annular zone of the diffraction grating lens of Example 1 as viewed from above. A diaphragm is disposed at a position distant from the diffraction grating plane, so that the effective area on the diffraction grating plane corresponds to less than all of the annular zones. Accordingly, less than all annular zones, that is in the effective area, is illustrated in FIG. 15. In the diffraction grating lens of this Example, a recess 18 was provided at the edge portion of each annular zone 15A or 15B, and a protrusion 19 was provided at the boundary with an adjoining annular zone. The graph indicated below represents a profile of the annular zone along the height direction, where the design step length d as determined by eq. (3) is defined as 100%. In the diffraction grating lens of this Example, a smallest width P of the annular zone is 9 µm, within which a width A of the recess 18 and a width B of the protrusion 19 each accounted for 3 µm.

A quantitative evaluation of stripe flare 171 was performed by using the diffraction grating lens of this Example. The diffraction grating lens was produced via injection molding using bisphenol A-type polycarbonate (d line refractive index 1.585; Abbe number 27.9), and at the same time, recesses 18 and protrusions 19 were formed in the entire circumference of every annular zone 15A and 15B. The design step length d was 15 µm, and the respective heights of the recesses 18 and the protrusions 19 were 1.5 µm; and in a manner of covering them, an optical adjustment layer was formed from a composite material (d line refractive index 1.623, Abbe number 40) obtained by dispersing zirconium oxide particles (average particle size 5 nm) in an acrylate-type UV-curing resin. A camera incorporating the diffraction grating lens of this Example was placed in a darkroom, and a halogen lamp was placed in a direction corresponding to a half-angle of view of 60 degrees. From an image of the halogen lamp which was taken by using the camera, a cumulative luminance of stripe flare 171 occurring in its surrounding was calculated.

From the above evaluation, it was confirmed that, by using the diffraction grating lens of this Example, the cumulative luminance of stripe flare 171 was reduced by 63% relative to the case where the diffraction grating lens of Comparative Example 1 described later was used.

EXAMPLE 2

Figure 16:
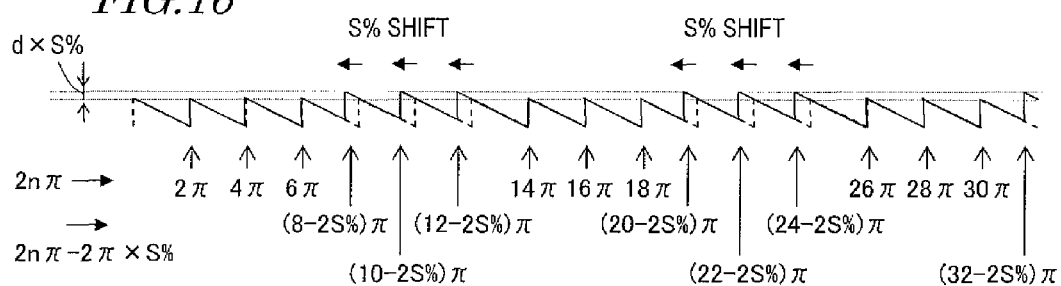
[FIG. 16] A schematic diagram showing the positions of diffraction steps in Example 2.

In this Example, as shown in FIG. 16, three diffraction steps were successively provided at positions where the phase difference from the base shape was $(2n\pi - 2\pi \times S)$ (S=0.4), and three diffraction steps were successively provided where it was $2n\pi$, these being disposed in alternation. The first order was used as the order of diffraction. Furthermore, similarly to FIG. 14, recesses 18 were provided at the edge portions of the annular zones 15A and 15B, and protrusions 19 were provided at the boundaries with adjoining annular zones.

A quantitative evaluation of stripe flare 171 was performed by using the diffraction grating lens of this Example. The diffraction grating lens was produced in a similar manner to Example 1. It was confirmed that, by using the diffraction grating lens of this Example, the cumulative luminance of stripe flare 171 was reduced by 63% relative to the case where the diffraction grating lens of Comparative Example 1 described later was used.

COMPARATIVE EXAMPLE 1

Figure 17:
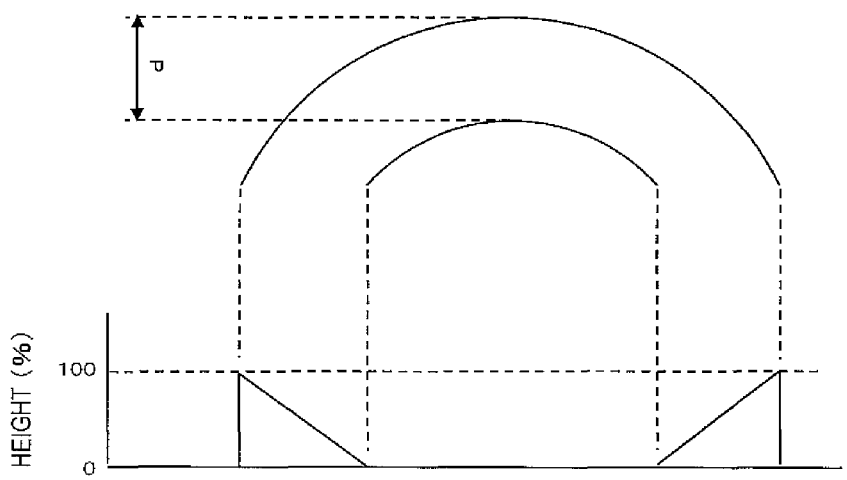
[FIG. 17] A diagram showing one annular zone of a diffraction grating lens of Comparative Example 1 as viewed from above, and a diagram showing a height profile thereof.

FIG. 17 is a diagram showing one annular zone of a diffraction grating lens of Comparative Example 1 as viewed from above. A diaphragm is disposed at a position distant from the diffraction grating plane, so that the effective area on the diffraction grating plane corresponds to a portion of the annular zone. Accordingly, only a portion of the annular zone that is in the effective area is illustrated in FIG. 17. The diffraction annular zones of Comparative Example 1 have the same base shape as that in Example 1; however, neither the recesses 18 nor the protrusions 19 are formed.

By a method similar to Example 1, an evaluation of stripe flare 171 was performed by using the diffraction grating lens of this Comparative Example, which indicated that the stripe flare 171 occurred more toward the image center than the inherent point of convergence of an image of the halogen lamp.

INDUSTRIAL APPLICABILITY

A diffraction grating lens according to the present invention and an imaging device in which the same is used have a function of reducing stripes of flare light, and are particularly useful for a high quality camera. For example, they are available for applications such as digital cameras, cameras to be mounted on mobile devices, automobile cameras, surveillance cameras, cameras for medical uses, distance measurement sensors, and motion sensors.

REFERENCE SIGNS LIST 11, 81, 82, diffraction grating lens
12, 93, 151 lens body
13, 152 diffraction grating
14, 153 optical axis
15A, 15B, 191 annular zone
16A, 16B annular zone surface
17A, 17B diffraction step
18 recess
19 protrusion
20A, 20B edge of diffraction step
21A, 21B foot of diffraction step
31, 161 optical adjustment layer
91 imaging device
92 lens
94 diaphragm
95, 154 imaging sensor
141 step height of diffraction grating
155 first-order diffracted light
156 diffracted light of unwanted orders
171 stripe flare
192 effective area
201 bending-around of wavefront

The invention claimed is:
1. A diffraction grating lens comprising:
a lens body; and
a diffraction grating provided on a surface of the lens body, the diffraction grating having a plurality of diffraction steps relative to a base shape and a plurality of concentric annular zones each sandwiched by an adjoining pair among the plurality of diffraction steps, wherein,
the lens body is made of a first material having a refractive index $n_1(\lambda)$ at a used wavelength $\lambda$;
the diffraction grating is in contact with air;
the relationship of

$$0.9d \leq \frac{m \cdot \lambda}{n_1(\lambda) - 1} \leq 1.1d$$

is satisfied, where d is a design step length of the diffraction steps, and m is an order of diffraction;
each of the plurality of annular zones includes an intermediate portion and a pair of end portions sandwiching the intermediate portions along a radial direction, and in at least one of the plurality of annular zones, either one of a recess and a protrusion is provided in at least a portion of one of the pair of end portions, and the other one of the recess and the protrusion is provided in at least a portion of the other of the pair of end portions;

at positions excluding an outer peripheral edge of the diffraction grating, the plurality of diffraction steps include a plurality of first diffraction steps and at least one second diffraction step adjoining at least one of the plurality of first diffraction steps;

edges of the plurality of first diffraction steps according to the design step length are located on a first face resulting from translating the base shape along an optical axis direction of the diffraction grating, and an edge of the at least one second diffraction step according to the design step length is located on a second face resulting from translating the base shape along the optical axis direction; and the first face and the second face are at respectively different positions along the optical axis.

2. The diffraction grating lens of claim 1, wherein,
the plurality of diffraction steps include a plurality of second diffraction steps; and
the first diffraction steps and the second diffraction steps alternate with each other.

3. The diffraction grating lens of claims 1, wherein an interval L between the first face and the second face along the optical axis satisfies the following inequality $$0.4d \le L \le 0.9d.$$

4. The diffraction grating lens of claim 3, wherein the interval L between the first face and the second face along the optical axis satisfies the following inequality $$0.4d \le L \le 0.6d.$$

5. The diffraction grating lens of claim 4, wherein the interval L between the first face and the second face along the optical axis satisfies $L=0.5d$.

6. The diffraction grating lens of claim 1, wherein,
the plurality of diffraction steps include a plurality of second diffraction steps; and
the plurality of first diffraction steps and the plurality of second diffraction steps are disposed in successive units of i (where i is an integer of 2 or more) and successive units of j (where j is an integer of 2 or more), respectively, the i first diffraction steps alternating with the j second diffraction steps.

7. The diffraction grating lens of claims 1, wherein at least one of the protrusion and the recess is provided in a substantially entire circumference of the at least one annular zone.

8. The diffraction grating lens of claims 1, wherein a width of the protrusion and the recess along a direction which is on a plane containing the optical axis of the diffraction grating and which is perpendicular to the optical axis is in a range of no less than 5% and no more than 25% of a width of the at least one annular zone along a direction which is on a plane containing the optical axis of the diffraction grating and which is perpendicular to the optical axis.

9. The diffraction grating lens of claims 1, wherein a height of the protrusion and the recess along the optical axis direction of the diffraction grating is in a range of no less than 3% and no more than 20% of a design step length d of the diffraction step.

10. The diffraction grating lens of claims 1, wherein, the protrusions and the recesses are provided in the plurality of annular zones.

11. The diffraction grating lens of claims 1, wherein the protrusions and the recesses are provided in at least two or more of the plurality of annular zones that are near an outer periphery of the diffraction grating.

12. The diffraction grating lens of claims 1, wherein the used wavelength $\lambda$ is a wavelength in a visible light region, such that $\lambda$ satisfies the inequality for any wavelength in the entire visible light region.

13. An imaging device comprising:
the diffraction grating lens of claims 1; and
an imaging sensor.

14. A diffraction grating lens comprising:
a lens body;
a diffraction grating provided on a surface of the lens body, the diffraction grating having a plurality of diffraction steps relative to a base shape and a plurality of concentric annular zones each sandwiched by an adjoining pair among the plurality of diffraction steps; and
an optical adjustment layer provided on the lens body, the optical adjustment layer covering the diffraction grating, wherein,
the lens body is made of a first material having a refractive index $n_1(\lambda)$ at a used wavelength $\lambda$;
the optical adjustment layer is made of a second material having a refractive index $n_2(\lambda)$ at the used wavelength $\lambda$;
the relationship of $$0.9d \le \frac{m \cdot \lambda}{n_1(\lambda) - n_2(\lambda)} \le 1.1d$$

is satisfied, where d is a design step length of the diffraction steps, and m is an order of diffraction;

each of the plurality of annular zones includes an intermediate portion and a pair of end portions sandwiching the intermediate portions along a radial direction, and in at least one of the plurality of annular zones, either one of a recess and a protrusion is provided in at least a portion of one of the pair of end portions, and the other one of the recess and the protrusion is provided in at least a portion of the other the one of the pair of end portions;

at positions excluding an outer peripheral edge of the diffraction grating, the plurality of diffraction steps include a plurality of first diffraction steps and at least one second diffraction step adjoining at least one of the plurality of first diffraction steps;

edges of the plurality of first diffraction steps according to the design step length are located on a first face resulting from translating the base shape along an optical axis direction of the diffraction grating, and an edge of the at least one second diffraction step according to the design step length is located on a second face resulting from translating the base shape along the optical axis direction; and the first face and the second face are at respectively different positions along the optical axis.

15. A diffraction grating lens comprising:
a lens body; and
a diffraction grating provided on a surface of the lens body, the diffraction grating having a plurality of diffraction steps relative to a base shape and a plurality of concentric annular zones each sandwiched by an adjoining pair among the plurality of diffraction steps, wherein,
the lens body is made of a first material having a refractive index $n_1(\lambda)$ at a used wavelength $\lambda$;
the diffraction grating is in contact with air;

the relationship of $$0.9d \leq \frac{m \cdot \lambda}{n_1(\lambda) - 1} \leq 1.1d$$

is satisfied, where d is a design step length of the diffraction steps, and m is an order of diffraction;

each of the plurality of annular zones includes an intermediate portion and a pair of end portions sandwiching the intermediate portions along a radial direction, and in at least one of the plurality of annular zones, either one of a recess and a protrusion is provided in at least a portion of one of the pair of end portions, and the other one of the recess and the protrusion is provided in at least a portion of the other of the pair of end portions; and the plurality of annular zones include first, second, and third annular zones adjoining one another, the second annular zone being interposed between the first and third annular zones, widths of the first annular zone and the third annular zone being substantially identical, and a width of the second annular zone being narrower than the width of the first annular zone.

* * * * *